United States Patent
Bedoukian

(10) Patent No.: US 10,624,341 B2
(45) Date of Patent: *Apr. 21, 2020

(54) FORMULATIONS FOR KILLING AGRICULTURAL PESTS

(71) Applicant: BEDOUKIAN RESEARCH, INC., Danbury, CT (US)

(72) Inventor: Robert H. Bedoukian, West Redding, CT (US)

(73) Assignee: BEDOUKIAN RESEARCH, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,089

(22) Filed: Sep. 7, 2018

(65) Prior Publication Data
US 2019/0075793 A1  Mar. 14, 2019

Related U.S. Application Data

(60) Provisional application No. 62/609,402, filed on Dec. 22, 2017, provisional application No. 62/557,266, filed on Sep. 12, 2017.

(51) Int. Cl.
*A01N 43/08* (2006.01)
*A01N 43/16* (2006.01)
(Continued)

(52) U.S. Cl.
CPC .......... *A01N 43/08* (2013.01); *A01N 25/14* (2013.01); *A01N 27/00* (2013.01); *A01N 31/06* (2013.01);
(Continued)

(58) Field of Classification Search
CPC ................. A01N 37/42; A01N 43/08
See application file for complete search history.

(56) References Cited

U.S. PATENT DOCUMENTS 7,129,271 B2 * 10/2006 Maupin .............. A01N 27/00
514/475
7,884,130 B2    2/2011 Zucca et al.
(Continued)

FOREIGN PATENT DOCUMENTS

WO    WO 2013/165477   * 11/2013
WO       2014053398 A1   4/2014

OTHER PUBLICATIONS

Metcalf's, Insect Control, 2012, Wiley-VCH, pp. 264-322.*
(Continued)

*Primary Examiner* — Rei Tsang Shiao

(74) *Attorney, Agent, or Firm* — Ohlandt, Greeley, Ruggiero & Perle, L.L.P.

(57) ABSTRACT

Killing one or more agricultural pests is accomplished by bringing the agricultural pests into contact with a toxic amount of a formulation comprising: (I) one or more compounds selected from the group consisting of: (1) one or more compounds of structure (A), wherein the compounds of structure (A) comprise:

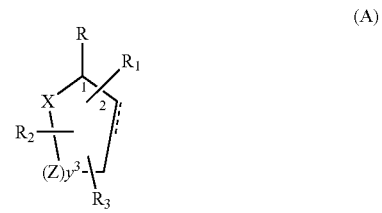

(A)

wherein R is selected from the group consisting of —OH, =O, —OC(O)$R_4$, —O$R_6$, —(O$R_6$)$_2$, wherein each $R_6$ is independently selected from an alkyl group containing from 1 to 4 carbon atoms and R is a branched or straight chain, saturated or unsaturated hydrocarbyl group with zero to two double bonds and from 1 to 15 carbon atoms; X is O or $CH_2$, with the proviso that when X is O, then R can only be =O; each Z is independently selected from the group consisting of (CH) and ($CH_2$); y is a numeral selected from 1 and 2; $R_1$ is selected from the group consisting of H or a branched or straight chain, saturated or unsaturated hydrocarbyl group with zero to two double bonds and from 1 to 15 carbon atoms; $R_2$ is selected from the group consisting of H and a branched or straight chain, saturated or unsaturated hydrocarbyl group with zero to three double bonds and from 1 to 15 carbon atoms; $R_3$ is selected from the group consisting of H and a branched or straight chain, saturated or unsaturated hydrocarbyl group with zero to three double bonds and from 1 to 15 carbon atoms, —($CH_2$)$_n$OH, —C(O)O$R_5$, —$CH_2$C(O)O$R_7$, —$CH_2$C(O)$R_8$, —C(O)N$R_9$$R_{10}$, —$CH_2$C(O)N$R_{11}$$R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12; the bond between the 2 and 3 positions in the ring structure may be a single or a double bond; and wherein the compounds of structure (A) contain from 11 to 20 total carbon atoms; and (2) one or more sesquiterpenes selected from the group consisting of acyclic, monocyclic, bicyclic and tricyclic sesquiterpenes and derivatives thereof; and (II) one or more toxicant compounds selected from the group consisting of carbamates, organochlorines, pyrethroids, sulfoximines, neonicotinoids, pyridine azomethines, diamides, organophosphates, phenylpyrazoles, oxadiazines, and ketoenols. The formulation can be a synergistic formulation.

19 Claims, 4 Drawing Sheets

(51) Int. Cl.
*A01N 37/18* (2006.01)
*A01N 35/06* (2006.01)
*A01N 37/02* (2006.01)
*A01N 31/06* (2006.01)
*A01N 25/14* (2006.01)
*A01N 27/00* (2006.01)
*A01N 37/42* (2006.01)
*A01N 41/02* (2006.01)
*A01N 57/10* (2006.01)
*A01N 43/40* (2006.01)
*A01N 43/88* (2006.01)

(52) U.S. Cl.
CPC ............ *A01N 35/06* (2013.01); *A01N 37/02* (2013.01); *A01N 37/18* (2013.01); *A01N 37/42* (2013.01); *A01N 43/16* (2013.01); *A01N 41/02* (2013.01); *A01N 43/40* (2013.01); *A01N 43/88* (2013.01); *A01N 57/10* (2013.01); *A01N 2300/00* (2013.01)

(56) References Cited

U.S. PATENT DOCUMENTS

| | | | |
|---|---|---|---|
| 10,172,349 B2 * | 1/2019 | Bedoukian | A01N 31/06 |
| 2015/0305331 A1 * | 10/2015 | Gewehr | A01N 37/42 504/100 |
| 2016/0186168 A1 | 6/2016 | Konieczka et al. | |

OTHER PUBLICATIONS

International Search Report and Written Opinion for corresponding application No. PCT/US18/50005, dated Jan. 10, 2019, 15 pages.
International Search Report and Written Opinion for corresponding application No. PCT/US18/50453, dated Jan. 4, 2019, 15 pages.

* cited by examiner

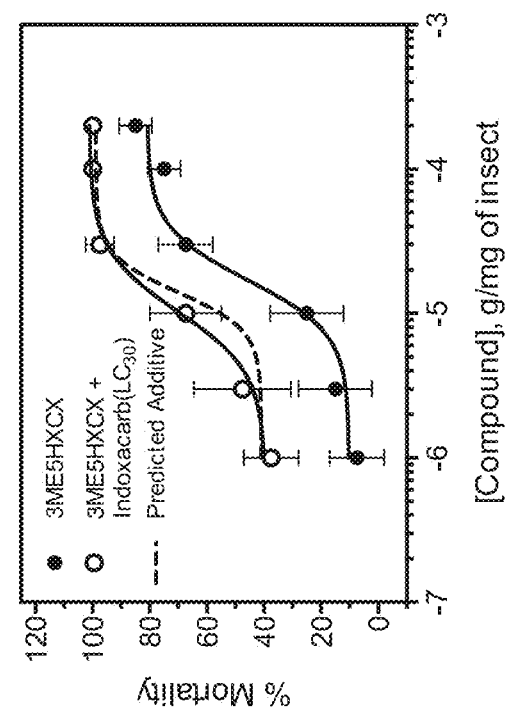

3-METHYL-5-HEXYL-2-CYCLOHEXEN-1-ONE:
$LC_{50}$: 16.9 µg/mg of insect
95% CI: 12-23 µg/mg of insect

Predicted Additive Toxicity with Indoxacarb ($LC_{30}$):
$LC_{50}$: 11 µg/mg of insect
95% CI: 7-21 µg/mg of insect

Actual Toxicity with Indoxacarb ($LC_{30}$):
$LC_{50}$: 10.3 µg/mg of insect
95% CI: 7-15 µg/mg of insect

Statistical Significance between Actual and Predicted
No

Note: L3 were tested by topical application and averaged 10.3 mg each

Fig. 3

FORMULATIONS FOR KILLING AGRICULTURAL PESTS

RELATED APPLICATION

This application claims the benefit of U.S. Provisional Application Ser. No. 62/609,402, filed Dec. 22, 2017, and U.S. Provisional Application Ser. No. 62/557,266, filed Sep. 12, 2017, both of which are incorporated herein by reference.

BACKGROUND OF THE DISCLOSURE

1. Field of the Disclosure

This disclosure relates to formulations, including synergistic formulations, used to kill agricultural pests.

2. Description of the Related Art

The use of agrochemical products plays an important role in the production of food, as they are essential to increase crop productivity and, thus, to meet the growing demand caused by the rapidly growing world population.

Agrochemical products include, for example, pesticides or agricultural pesticides, which consist of formulations with one or more active ingredients effective in pest and disease control and are commonly classified according to their use, wherein herbicides, insecticides, fungicides, nematicides and acaricides are the most commonly used. The pesticides are rarely applied in the pure form, as the products found in the market are usually formulations comprising one or more active ingredients and other substances classified as inert, which enhance their effects and facilitate their application. When these inert compounds aid the action of the active ingredient and/or modify the physico-chemical characteristics of each spray, they are called adjuvants.

Carbamate, organochlorine, pyrethroid, sulfoximine, neonicotinoid, pyridine azomethine, diamide, organophosphate, phenylpyrazole, oxadiazine, and ketoenol pesticides are commonly used against agricultural pests. Safety questions have been raised concerning the use of certain of these pesticides, and some governments have restricted the amount of the active component that may be employed in formulations. This itself presents a further problem since the efficacy of certain of these pesticides declines over time and therefore they need to be formulated at higher than effective dosages in order to maintain their effectiveness. Furthermore, some agricultural pests have developed resistance to certain of these pesticides due to their wide spread usage. Also, certain of these pesticides are relatively expensive.

In addition, a further problem involves agricultural pests which may not be exposed to areas of pesticide application or are not easily contacted with a pesticide spray such as, for example, aphids which can hide under leaves. There is a need to cause agricultural pests that are not easily contacted with a pesticide spray to move around more and increase their contact with the pesticide, thus rendering the pesticide more effective.

Research regarding the key attributes of agricultural pest toxicants strongly suggests that farmers and consumers prefer products with high efficacy, long-lasting protection, and safety in use. Leading agricultural pest toxicant products currently available to farmers and consumers claim to meet these requirements but almost always disappoint the user for having one or more unacceptable properties. Thus, there is a need to provide agricultural pest toxicant products, especially Coleoptera, Diptera, Hymenoptera, Lepidoptera, Orthoptera, Thysanoptera, Acari, and Hemiptera toxicant products, which meet the preferences of farmers and consumers.

In particular, there is a need to provide an agricultural pest toxicant formulation which minimizes exposure of toxicants to the people, plants, and other animals which may be exposed to areas of application. A further need is for an agricultural pest toxicant formulation that overcomes or minimizes resistance to conventional pesticides and provides long lasting effects, thereby limiting the need for frequent re-application to treated areas.

A yet further need is for an agricultural pest toxicant formulation that is safe for humans, animals and the environment that can be used to kill agricultural pests, and for safe and effective means to employ such chemicals.

The present disclosure provides many advantages, which shall become apparent as described below.

SUMMARY OF THE DISCLOSURE

In accordance with this disclosure, killing one or more agricultural pests is obtained by bringing the agricultural pests into contact with a toxic amount of a formulation comprising:

(I). one or more compounds selected from the group consisting of:

(1) one or more compounds of structure (A), wherein the compounds of structure (A) comprise:

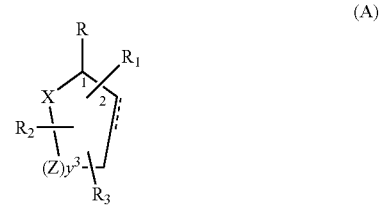

wherein

R is selected from the group consisting of —OH, =O, —OC(O)R$_4$, —OR$_6$, —(OR$_6$)$_2$, wherein each R$_6$ is independently selected from an alkyl group containing from 1 to 4 carbon atoms and R$_4$ is a branched or straight chain, saturated or unsaturated hydrocarbyl group with zero to two double bonds and from 1 to 15 carbon atoms;

X is O or CH$_2$, with the proviso that when X is O, then R can only be =O;

each Z is independently selected from the group consisting of (CH) and (CH$_2$);

y is a numeral selected from 1 and 2;

R$_1$ is selected from the group consisting of H or a branched or straight chain, saturated or unsaturated hydrocarbyl group with zero to two double bonds and from 1 to 15 carbon atoms;

R$_2$ is selected from the group consisting of H and a branched or straight chain, saturated or unsaturated hydrocarbyl group with zero to three double bonds and from 1 to 15 carbon atoms;

R$_3$ is selected from the group consisting of H and a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (A) contain from 11 to 20 total carbon atoms; and (2) one or more sesquiterpenes selected from the group consisting of acyclic, monocyclic, bicyclic and tricyclic sesquiterpenes and derivatives thereof; and (II) one or more toxicant compounds selected from the group consisting of carbamates, organochlorines, pyrethroids, sulfoximines, neonicotinoids, pyridine azomethines, diamides, organophosphates, phenylpyrazoles, oxadiazines, and ketoenols.

Also, in accordance with this disclosure, killing one or more agricultural pests is obtained by bringing the agricultural pests into contact with a toxic amount of a synergistic formulation comprising one or more of the compounds of (I) and one or more toxicant compounds of (II) selected from the group consisting of carbamates, organochlorines, pyrethroids, sulfoximines, neonicotinoids, pyridine azomethines, diamides, organophosphates, phenylpyrazoles, oxadiazines, and ketoenols. The synergistic formulation produces, when the agricultural pests are brought into contact with the synergistic formulation, a combined toxicant effect greater than the sum of the separate toxicant effects from the separate compounds of (I) and toxicant compounds of (II), at comparable concentrations.

Further, in accordance with this disclosure, killing one or more agricultural pests is obtained by bringing the agricultural pests into contact with a toxic amount of a combination formulation comprising one or more of the compounds of (I) and one or more toxicant compounds of (II) selected from the group consisting of carbamates, organochlorines, pyrethroids, sulfoximines, neonicotinoids, pyridine azomethines, diamides, organophosphates, phenylpyrazoles, oxadiazines, and ketoenols. The combination formulation produces, when the agricultural pests are brought into contact with the combination formulation, an effective combined toxicant effect that offers benefits such as reduced resistance to the formulation or reduced levels of conventional toxicant compounds (carbamates, organochlorines, pyrethroids, sulfoximines, neonicotinoids, pyridine azomethines, diamides, organophosphates, phenylpyrazoles, oxadiazines, and ketoenols) in order to be effective.

In accordance with this disclosure, a method is provided for killing agricultural pests, in particular, agricultural pests which may not be exposed to areas of pesticide application or are not easily contacted with a pesticide spray such as, for example, aphids which can hide under leaves. The formulations of this disclosure cause agricultural pests that are not easily contacted with a pesticide spray to move around more and increase their contact with the pesticide, thus rendering the pesticide more effective.

The one or more compounds of structure (A) can be effective or render the toxicant compounds of (II) more effective, both by being toxic themselves and/or by acting as a repellent which causes the agricultural pests to move around and increase their contact with pesticide treated surfaces. Thus, the one or more compounds of structure (A) can be used in an effective toxic amount or repellent amount in the formulations of this disclosure.

This disclosure also includes optical isomers, diastereomers and enantiomers of the named structures. Thus, at all stereocenters where stereochemistry is not explicitly defined, all possible epimers are envisioned. As an aspect of this disclosure, the killing of the agricultural pests may be by way of the compounds being toxic to the agricultural pests and immatures thereof.

Further objects, features and advantages of the present disclosure will be understood by reference to the following detailed description.

BRIEF DESCRIPTION OF THE DRAWINGS

FIG. 3 graphically shows percent mortality for *Helicoverpa zea* (Lepidopteran) with 3-methyl-5-hexyl-2-cyclohexen-1-one using protocols in accordance with the Examples.

DESCRIPTION OF THE EMBODIMENTS

Figure 1:
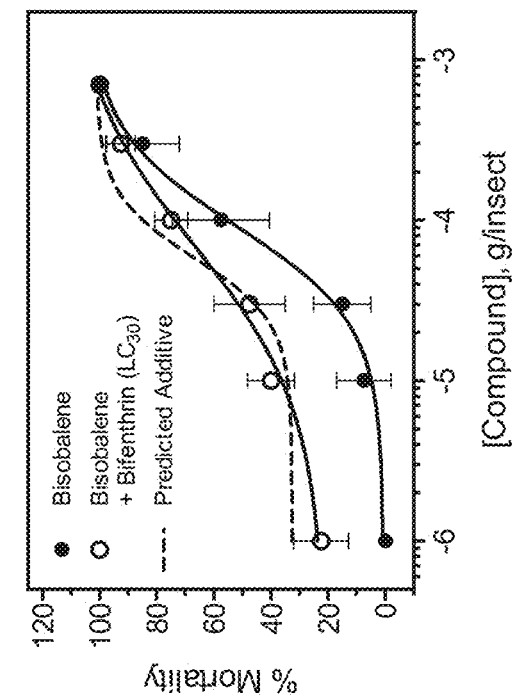
FIG. 1 graphically shows percent mortality for *Cylas formicarius* (Coleopteran) with bisobalene using protocols in accordance with the Examples.

Killing one or more agricultural pests selected from Coleoptera, Diptera. Hymenoptera, Lepidoptera, Orthoptera, Thysanoptera, Acari, and Hemiptera is accomplished by bringing the agricultural pests into contact with a toxic amount of a formulation comprising:

(I) one or more compounds selected from the group consisting of:

(1) one or more compounds of structure (A), wherein the compounds of structure (A) comprise:

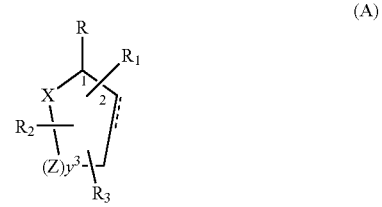

wherein

R is selected from the group consisting of —OH, =O, —OC(O)$R_4$, —O$R_6$, —(O$R_6$)$_2$, wherein each $R_6$ is independently selected from an alkyl group containing from 1 to 4 carbon atoms and $R_4$ is a branched or straight chain, saturated or unsaturated hydrocarbyl group with zero to two double bonds and from 1 to 15 carbon atoms;

X is O or $CH_2$, with the proviso that when X is O, then R can only be =O:

each Z is independently selected from the group consisting of (CH) and ($CH_2$);

y is a numeral selected from 1 and 2;

$R_1$ is selected from the group consisting of H or a branched or straight chain, saturated or unsaturated hydrocarbyl group with zero to two double bonds and from 1 to 15 carbon atoms;

$R_2$ is selected from the group consisting of H and a branched or straight chain, saturated or unsaturated hydrocarbyl group with zero to three double bonds and from 1 to 15 carbon atoms:

R₃ is selected from the group consisting of H and a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (A) contain from 11 to 20 total carbon atoms; and (2) one or more sesquiterpenes selected from the group consisting of acyclic, monocyclic, bicyclic and tricyclic sesquiterpenes and derivatives thereof; and (II) one or more toxicant compounds selected from the group consisting of carbamates, organochlorines, pyrethroids, sulfoximines, neonicotinoids, pyridine azomethines, diamides, organophosphates, phenylpyrazoles, oxadiazines, and ketoenols.

Also, killing one or more agricultural pests selected from Coleoptera, Diptera, Hymenoptera, Lepidoptera, Orthoptera. Thysanoptera, Acari, and Hemiptera is accomplished by bringing the agricultural pests into contact with a toxic amount of a synergistic or non-synergistic formulation comprising one or more compounds of (I), and one or more toxicant compounds of (II) selected from the group consisting of carbamates, organochlorines, pyrethroids, sulfoximines, neonicotinoids, pyridine azomethines, diamides, organophosphates, phenylpyrazoles, oxadiazines, and ketoenols.

In an embodiment, the one or more toxicant compounds of (II) are selected from Aldicarb, Endosulfan, a synthetic pyrethroid, a sulfoximine, Thiamethoxam, Pymetrozine, a diamide, Chlorothalonil, Chlorpyrifos. and the like.

In another embodiment, the one or more agricultural pests are selected from beetles, flies, ants, moths, butterflies, grasshoppers, thrips, mites, true bugs, aphids, weevils, wasps, and the like.

In a further embodiment, the agricultural pests are selected from agricultural pests of fruit, agricultural pests of vegetables, agricultural pests of field crops, agricultural pests of ornamentals, agricultural pests of trees, agricultural pests of turf, and the like.

A preferred group of compounds of structure (A) are those wherein R is =O or —OH, X is CH$_2$, Z is (CH) or (CH$_2$), y is 1, the bond between positions 2 and 3 is a single bond, R$_1$ is H, R$_2$ is H, and R$_3$ is an alkenyl group having at least 11 carbon atoms and 1 or 2 double bonds.

A further preferred group of compounds of structure (A) are those wherein R is =O or —OH, X is CH$_2$, Z is (CH) or (CH$_2$), y is 1, the bond between positions 2 and 3 is a single bond, R$_1$ is an alkyl group having at least 5 carbon atoms, R$_2$ is H, and R$_3$ is —C(O)OR$_5$, and R$_3$ is an alkyl or alkenyl group containing at least 3 carbon atoms.

Another preferred group of compounds of structure (A) are those wherein R is =O, X is O, Z is CH or CH$_2$, y is 1 or 2, the bond between positions 2 and 3 is a single bond. R$_1$ is an alkyl group of from 7 to 11 carbon atoms, R$_2$ is H, and R$_3$ is H or CH$_3$.

An especially preferred group of compounds of structure (A) include methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and 3-methyl-5-heptyl-2-cyclohexenone.

Representative examples of compounds of structure (A) include, but are not limited to,

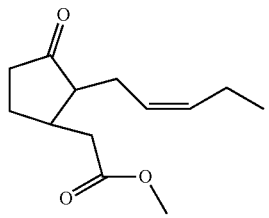

(Z)-methyl 2-(3-oxo-2-(pent-2-enyl)cyclpentyl)acetate
Chemical Formula: C$_{13}$H$_{20}$O$_3$
Molecular Weight: 224.30
Methyl Jasmonate

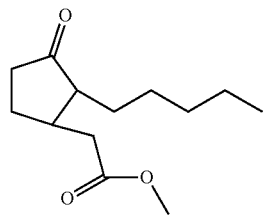

methyl 2-(3-oxo-2-pentylcyclopentyl)acetate
Chemical Formula: C$_{13}$H$_{22}$O$_3$
Molecular Weight: 226.31
Methyl Dihydro Jasmonate

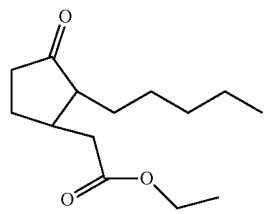

ethyl 2-(3-oxo-2-pentylcyclopentyl)acetate
Chemical Formula: C$_{14}$H$_{24}$O$_3$
Molecular Weight: 240.34
Ethyl Dihydro Jasmonate

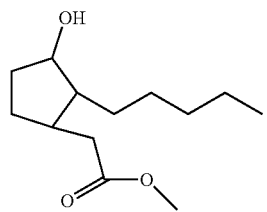

methyl 2-(3-hydroxy-2-pentylcyclopentyl)acetate
Chemical Formula: C$_{13}$H$_{24}$O$_3$
Molecular Weight: 228.33
Methyl Dihydro Jasmolate -continued

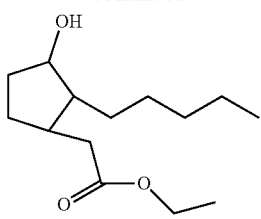

ethyl 2-(3-hydroxy-2-pentylcyclopentyl)acetate
Chemical Formula: $C_{14}H_{26}O_3$
Molecular Weight: 242.35
Ethyl Dihydro Jasmolate

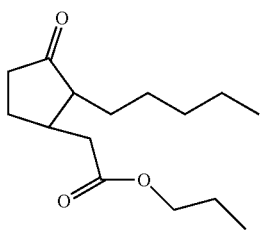

propyl 2-(3-oxo-2-pentylcyclopentyl)acetate
Chemical Formula: $C_{15}H_{26}O_3$
Molecular Weight: 254.37
Propyl Dihydro Jasmonate

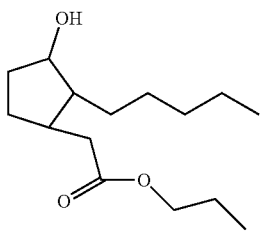

propyl 2-(3-hydroxy-2-pentylcyclopentyl)acetate
Chemical Formula: $C_{15}H_{28}O_3$
Molecular Weight: 256.38
Propyl Dihydro Jasmolate

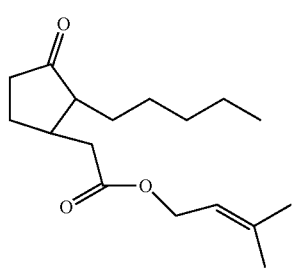

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate -continued

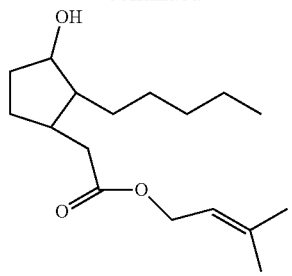

3-methylbut-2-enyl 2-(3-hydroxy-pentycyclopentyl)acetate
Chemical Formula: $C_{17}H_{30}O_3$
Molecular Weight: 282.42
Prenyl Dihdryo Jasmolate

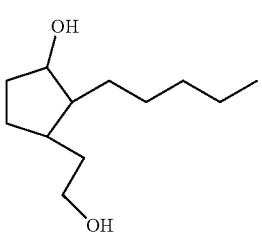

3-(2-hydroxyethyl)-2-pentylcyclopentanol
Chemical Formula: $C_{12}H_{24}O_2$
Molecular Weight: 200.32
MethylDihydroJasmodiol

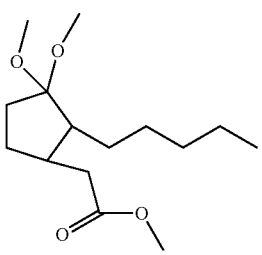

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

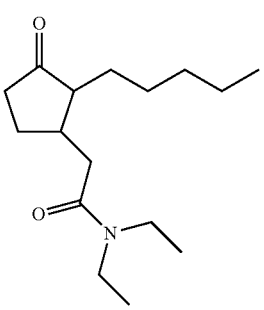

N,N-diethyl-2-(3-oxo-2-pentylcyclopentyl)acetamide
Chemical Formula: $C_{16}H_{29}NO_2$
Molecular Weight: 267.41
MDJ Amide -continued

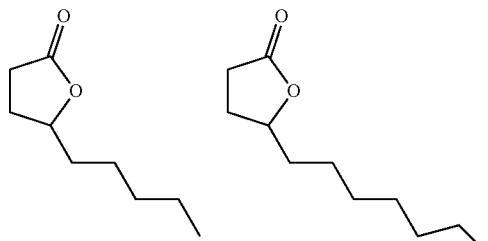

gamma Nonalactone
Chemical Formula: $C_9H_{16}O_2$
Molecular Weight: 156.22 gamma Undecalactone
Chemical Formula: $C_{11}H_{20}O_2$
Molecular Weight: 184.28

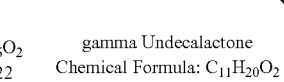

5-octyldihydrofuran-2(3H)-one
Chemical Formula: $C_{12}H_{22}O_2$
Molecular Weight: 198.30
gamma-dodecalactone

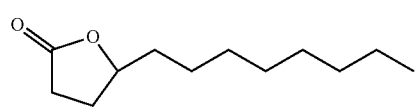

2H-Pyran-2-one, 6-heptyltetrahydro-
Chemical Formula: $C_{12}H_{22}O_2$
Molecular Weight: 198.31
Delta Dodecalactone

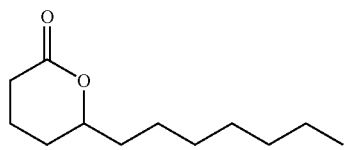

5-nonyldihydrofuran-2(3H)-one
Chemical Formula: $C_{13}H_{24}O$
Molecular Weight: 212.33
Gamma-Tridecalactone

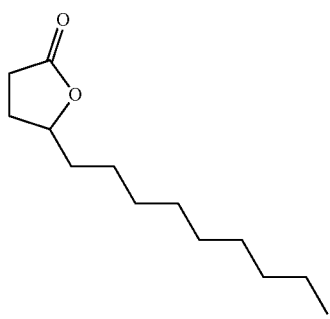

5-decyldihydrofuran-2(3H)-one
Chemical Formula: $C_{14}H_{26}O_2$
Molecular Weight: 226.36
Gamma-Tetradecalactone -continued

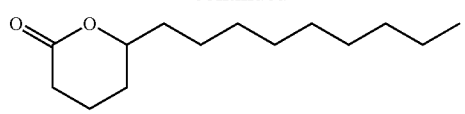

6-nonyltetrahydro-2H-pyran-2-one
Chemical Formula: $C_{14}H_{26}O_2$
Molecular Weight: 226.36
Delta-Tetradecalactone

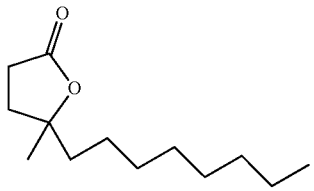

Gamma Methyl Dodecalactone
2(3H)-Furanone, 5-octyldihydro-5-methyl-

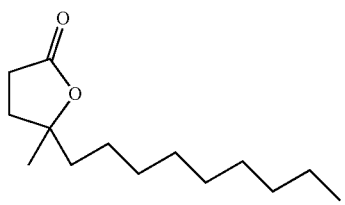

gamma Methyl Tridecalactone
5-methyl-5-nonyldihydrofuran-2(3H)-one
4-methyl-4-nonyl gamma butyrolactone
C14 lactone.

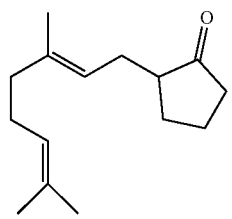

(E)-2-(3,7-dimethylocta-2,6-dienyl)cyclopentanone
Chemical Formula: $C_{15}H_{24}O$
Molecular Weight: 220.35
Apritone

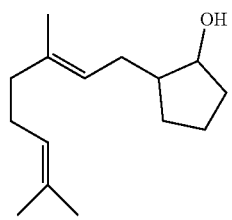

(E)-2-(3,7-dimethylocta-2,6-dienyl)cyclopentanol
Chemical Formula: $C_{15}H_{26}O$
Molecular Weight: 222.37
Apritol -continued

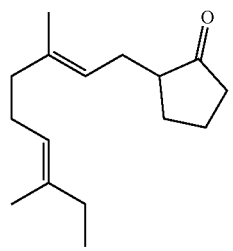

2-((2E,6E)-3,7-dimethylnona-2,6-dienyl)cyclopentanone
Chemical Formula: $C_{16}H_{26}O$
Molecular Weight: 234.38
Methyl Apritone

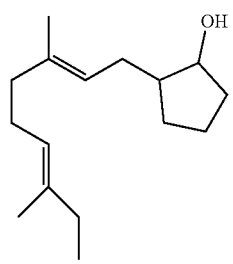

2-((2E,6E)-3,7-dimethylnona-2,6-dienyl)cyclopentanol
Chemical Formula: $C_{16}H_{28}O$
Molecular Weight: 236.39
Methyl Apritol

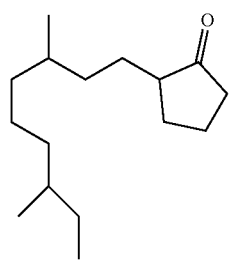

2-(3,7-dimethylnonyl)cyclopentanone
Chemical Formula: $C_{16}H_{30}O$
Molecular Weight: 238.41
Tetrahydromethyl Apritone

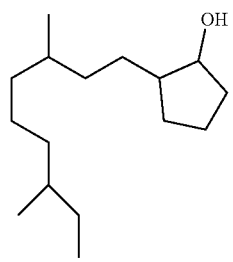

2-(3,7-dimethylnonyl)cyclopentanol
Chemical Formula: $C_{16}H_{32}O$
Molecular Weight: 240.42
Tetrahydromethyl Apritol -continued

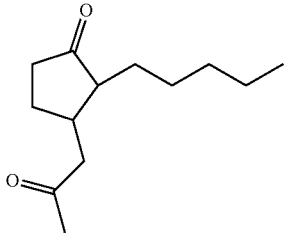

3-(2-oxopropyl)-2-pentylcyclopentanone
Chemical Formula: $C_{13}H_{22}O_2$
Molecular Weight: 210.31
Amyl Cyclopentanone Propanone

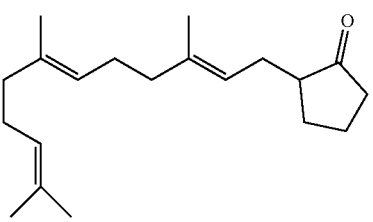

2-((2E,6E)-3,7,11-trimethyldodeca-2,6,10-trienyl)cyclopentanone
Chemical Formula: $C_{20}H_{32}O$
Molecular Weight: 288.47
Farnesylcyclopentanone

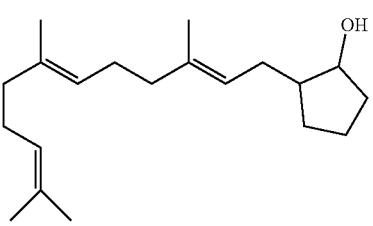

2-((2E,6E)-3,7,11-trimethyldodeca-2,6,10-trienyl)cyclopentanol
Chemical Formula: $C_{20}H_{34}O$
Molecular Weight: 290.48
Farnesylcyclopentanol

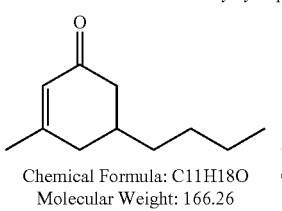 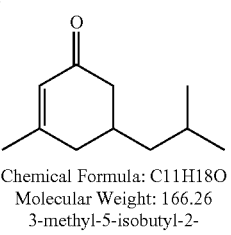

Chemical Formula: $C_{11}H_{18}O$
Molecular Weight: 166.26
3-methyl-5-butyl-2-cyclohexenone Chemical Formula: $C_{11}H_{18}O$
Molecular Weight: 166.26
3-methyl-5-isobutyl-2-cyclohexenone

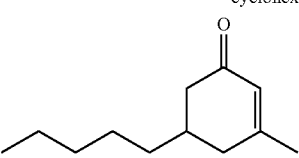

5-pentyl-3-methyl-2-cyclohexenone
Chemical Formula: $C_{12}H_{20}O$
Molecular Weight: 180.29

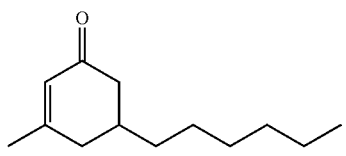

Chemical Formula: C13H22O
Molecular Weight: 194.31
3-methyl-5-hexyl-2-cyclohexenone

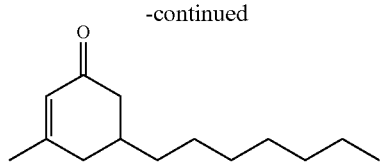

Chemical Formula: C14H24O
Molecular Weight: 208.34
3-methyl-5-heptyl-2-cyclohexenone

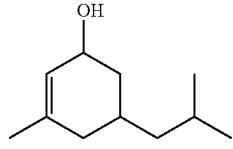

Chemical Formula: C11H20O
Molecular Weight: 168.28
3-methyl-5-isobutyl-2-cyclohexen-1-ol

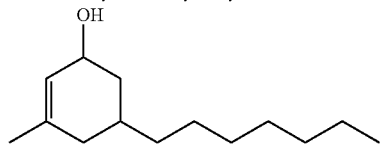

3-methyl-5-heptyl-2-cyclohexen-1-ol
Chemical Formula: C14H26O
Molecular Weight: 210.36

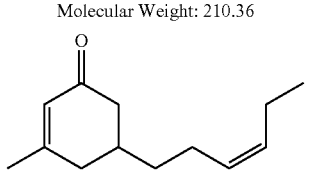

Chemical Formula: C13H20O
Molecular Weight: 192.30
3-methyl-5-(z-3-hexenyl)-2-cyclohexenone

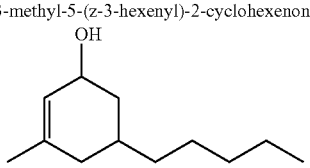

3-methyl-5-pentyl-2-cyclohexen-1-ol
Chemical Formula: C12H22O
Molecular Weight: 182.30

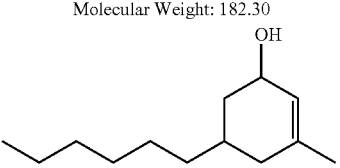

3-methyl-5-hexyl-2-cyclohexenol
Chemical Formula: $C_{13}H_{24}O$
Molecular Weight: 196.18

The sesquiterpenes useful in the formulations of this disclosure include acyclic, monocyclic, bicyclic and tricyclic sesquiterpenes and derivatives thereof. Sesquiterpenes are a class of terpenes that consist of three isoprene units and have the molecular formula $C_{15}H_{24}$.

In an embodiment, the sesquiterpenes include $C_{15}H_{24}$ hydrocarbons and alcohols and ketones derived from those hydrocarbons.

A preferred group of sesquiterpenes include valencene, nootkatone, nootkatol, farnesene (alpha and beta), farnesol, nerolidol, bisabolene, bisabolol, humulene, caryophyllene, longifolene, longifolenone, patchoulene and patchoulol. All isomeric configurations of sesquiterpenes are meant to be included.

Representative examples of sesquiterpenes include, but are not limited to,

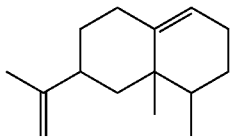

Valencene
Naphthalene, 1,2,3,5,6,7,8,8a-octahydro-1,8a-dimethyl-
7-(1-methylethenyl)-,
(1R,7R,8aS)-
Chemical Formula: $C_{15}H_{24}$
Molecular Weight: 204.35

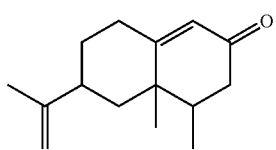

Nootkatone
2(3H)-Naphthalenone,4,4a,5,6,7,8-hexahydro-4,4a-dimethyl-
6-(1-methylethenyl)-, (4R,4aS,6R)-
Chemical Formula: $C_{15}H_{22}O$
Molecular Weight: 218.34

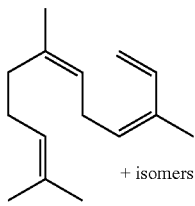

+ isomers

Farnesene
1,3,6,10-Dodecatetraene, 3,7,11-trimethyl-
Chemical Formula: $C_{15}H_{24}$
Molecular Weight: 204.35

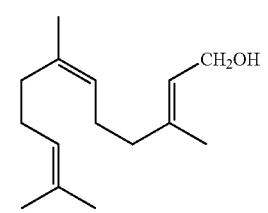

Farnesol
3,7,11-trimethyldodeca-2,6,10-trien-1-ol
Chemical Formula: $C_{15}H_{26}O$
Molecular Weight: 222.37

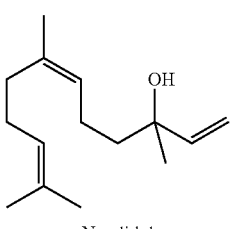

Nerolidol
1,6,10-Dodecatrien-3-ol, 3,7,11-trimethyl-
Chemical Formula: $C_{15}H_{26}O$
Molecular Weight: 222.37

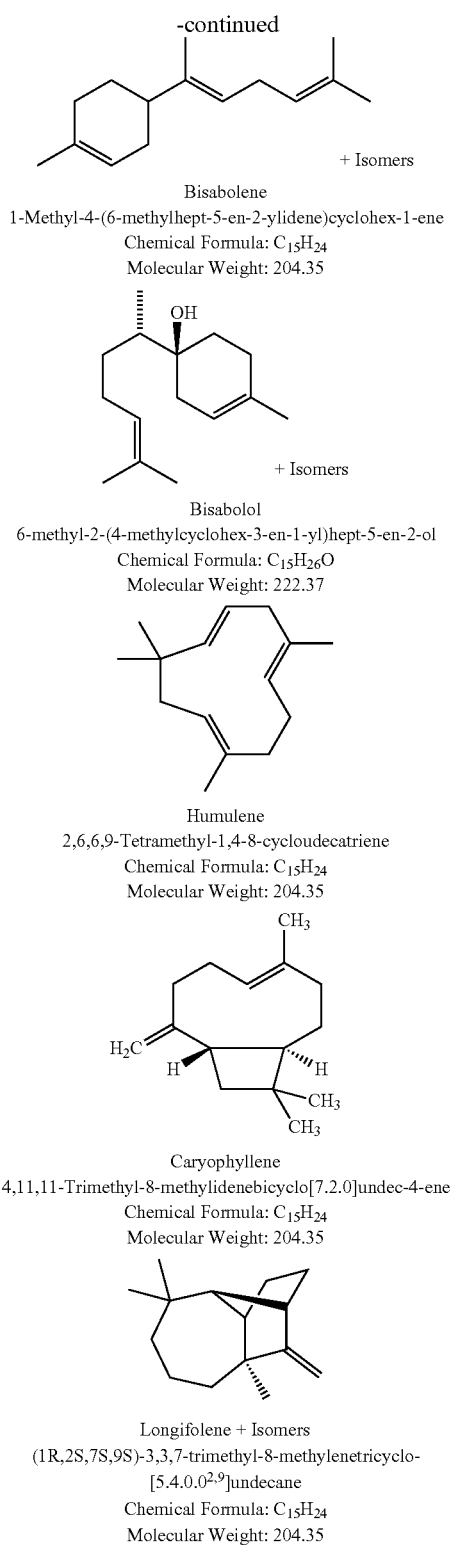

Bisabolene
1-Methyl-4-(6-methylhept-5-en-2-ylidene)cyclohex-1-ene
Chemical Formula: C$_{15}$H$_{24}$
Molecular Weight: 204.35

Bisabolol
6-methyl-2-(4-methylcyclohex-3-en-1-yl)hept-5-en-2-ol
Chemical Formula: C$_{15}$H$_{26}$O
Molecular Weight: 222.37

Humulene
2,6,6,9-Tetramethyl-1,4-8-cycloudecatriene
Chemical Formula: C$_{15}$H$_{24}$
Molecular Weight: 204.35

Caryophyllene
4,11,11-Trimethyl-8-methylidenebicyclo[7.2.0]undec-4-ene
Chemical Formula: C$_{15}$H$_{24}$
Molecular Weight: 204.35

Longifolene + Isomers
(1R,2S,7S,9S)-3,3,7-trimethyl-8-methylenetricyclo-
[5.4.0.0$^{2,9}$]undecane
Chemical Formula: C$_{15}$H$_{24}$
Molecular Weight: 204.35

The conventional toxicant compounds useful in the formulations of this disclosure include, for example, carbamates, organochlorines, pyrethroids, sulfoximines, neonicotinoids, pyridine azomethines, diamides, organophosphates, phenylpyrazoles, oxadiazines, and ketoenols.

Illustrative carbamate compounds useful in the formulations of this disclosure include, for example, alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, and the like.

Illustrative organochlorine compounds useful in the formulations of this disclosure include, for example, aldrin, dieldrin, endrin, heptachlor, chlordane, endosulfan, isobenzan, isodrin, dicofol, methoxychlor, benzene hexachloride, mirex, kepone, lindane, gamma-hexachlorocyclohexane, chlorobenziate, BHC, toxaphene, chloro propylate, and the like.

Illustrative pyrethroid compounds useful in the formulations of this disclosure include, for example, acrinathrin, allethrin, d-cis-trans allethrin, d-trans allethrin, bifenthrin, bioallethrin, bioallethrin scyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, thetacypermethrin, zeta-cypermethrin, cyphenothrin, (1r)-trans-isomers], deltamethrin, empenthrin (ez)-(1r)-isomers], esfenvalerate, etofenprox, fenpropathrin, fenvalerate, flucythrinate, flumethrin, tau-fluvalinate, halfenprox, imiprothrin, kadethrin, permethrin, phenothrin [(1r)-trans-isomer], prallethrin, pyrethrins (pyrethrum), resmethrin, silafluofen, tefluthrin, tetramethrin, tetramethrin, [(1r)-isomers], tralomethrin, transfluthrin, and the like.

Illustrative sulfoximine compounds useful in the formulations of this disclosure include, for example, sulfoxaflor, SFI-2, SFI-3, and the like.

Illustrative neonicotinoid compounds useful in the formulations of this disclosure include, for example, imidacloprid, thiamethoxam, clothianidin, acetamiprid, thiacloprid, dinotefuran, nitenpyram, nithiazine, and the like.

Illustrative pyridine azomethine compounds useful in the formulations of this disclosure include, for example, pymetrozine, pyrifluquinazon, and the like.

Illustrative diamide compounds useful in the formulations of this disclosure include, for example, flubendiamide, chlorantraniliprole, cyantraniliprole, and the like.

Illustrative organophosphate compounds useful in the formulations of this disclosure include, for example, acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-s-methyl, diazinon, dichlorvos/ddvp, dicrotophos, dimethoate, dimethylvinphos, disulfoton, epn, ethion, ethoprophos, famphur, fenamiphos, fenitrothion, fenthion, fosthiazate, heptenophos, imicyafos, isofenphos, isopropyl o-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, and the like.

Illustrative phenylpyrazole compounds useful in the formulations of this disclosure include, for example, fipronil, acetoprole, ethiprole, flufiprole, pyraclofos, pyrafluprole, pyrolan, vaniliprole, and the like.

Illustrative oxadiazine compounds useful in the formulations of this disclosure include, for example, Indoxacarb, and the like.

Illustrative ketoenol compounds useful in the formulations of this disclosure include, for example, spirodiclofen, spiromesifen, spirotetramat, and the like.

The active compounds of (I) and conventional toxicant compounds may be formulated into any suitable formulations such as for example, including but not limited to, granules, dusts, soluble powders, wettable powders, pastes, emulsifiable concentrates, aerosols, ultra low-volume concentrates, flowable suspensions, oils, sprays, lures, biodegradable flakes, or the like.

As described herein, the method of this disclosure provides for killing agricultural pests, in particular, agricultural pests which may not be exposed to areas of pesticide application or are not easily contacted with a pesticide spray such as, for example, aphids which can hide under leaves. The formulations of this disclosure cause agricultural pests that are not easily contacted with a pesticide spray to move around more and increase their contact with the pesticide, thus rendering the pesticide more effective.

The amount of the formulation comprising the at least one compound of (I) and the at least one conventional toxicant of (II) will depend upon the type of agricultural formulation used and the particular agricultural pest against which the agricultural formulation is employed.

In an embodiment, the agricultural formulation is used in a toxic amount, or a pesticidally effective amount, needed to achieve an observable effect on a pest, for example, the effects of necrosis, death, retardation, prevention, removal, destruction, or otherwise diminishing the occurrence and/or activity of a pest in a locus. This effect may come about when pest populations are repulsed from a locus, pests are incapacitated in, or around, a locus, and/or pests are exterminated in, or around, a locus. Also, a combination of these effects can occur. Generally, pest populations, activity, or both are desirably reduced more than fifty percent, preferably more than 90 percent, and most preferably more than 99 percent.

In general, a pesticidally effective amount, for agricultural purposes, is about 50 kilograms per acre or less, about 45 kilograms per acre or less, about 40 kilograms per acre or less, about 35 kilograms per acre or less, about 30 kilograms per acre or less, about 25 kilograms per acre or less, about 20 kilograms per acre or less, about 15 kilograms per acre or less, about 10 kilograms per acre or less, about 5 kilograms per acre or less, about 2.5 kilograms per acre or less, about 1 kilogram per acre or less, about 0.5 kilograms per acre or less, about 0.25 kilograms per acre or less, about 0.1 kilograms per acre or less, about 0.05 kilograms per acre or less, about 0.01 kilograms per acre or less, about 0.005 kilograms per acre or less, or about 0.001 kilograms per acre or less. A pesticidally effective amount is dependent on the particular pest, and also the particular target of application including, for example, fruits, vegetables, field crops, ornamentals, trees, turf, and the like.

In an embodiment, a particularly preferred pest group to kill or control is sap-feeding pests. Sap-feeding pests, in general, have piercing and/or sucking mouthparts and feed on the sap and inner plant tissues of plants. Examples of sap-feeding pests of particular concern to agriculture include, but are not limited to, aphids, leafhoppers, moths, scales, thrips, psyllids, mealybugs, stinkbugs, and whiteflies. Specific examples of Orders that have sap-feeding pests of concern in agriculture include but are not limited to, Anoplura and Hemiptera. Specific examples of Hemiptera that are of concern in agriculture include, but are not limited to, *Aulacaspis* spp., *Aphrophora* spp., *Aphis* spp., *Bemisia* spp., *Coccus* spp., *Euschistus* spp., *Halyomorpha* spp., *Lygus* spp., *Macrosiphum* spp., *Nezara* spp., and *Rhopalosiphum* spp.

Another particularly preferred pest group to kill or control is chewing pests. Chewing pests, in general, have mouthparts that allow them to chew on the plant tissue including roots, stems, leaves, buds, and reproductive tissues (including, but not limited to flowers, fruit, and seeds). Examples of chewing pests of particular concern to agricultural include, but are not limited to, caterpillars, beetles, grasshoppers, and locusts. Specific examples of Orders that have chewing pests of concern in agriculture include but are not limited to, Coleoptera and Lepidoptera. Specific examples of Coleoptera that are of concern in agriculture include, but are not limited to, *Anthonomus* spp., *Cerotoma* spp., *Chaetocnema* spp., *Colaspis* spp., *Cyclocephala* spp., *Diabrotica* spp., *Hypera* spp., *Phyllophaga* spp., *Phyllotreta* spp., *Sphenophorus* spp., *Sitophilus* spp.

The formulations of this disclosure can be formulated to exhibit broad spectrum pesticidal activity. A pesticide is many times not suitable for application in its pure form. It is usually necessary to add other substances so that the pesticide may be used at the required concentration and in an appropriate form, permitting ease of application, handling, transportation, storage, and maximum pesticide activity. Thus, pesticides are formulated into, for example, baits, concentrated emulsions, dusts, emulsifiable concentrates, fumigants, gels, granules, microencapsulations, seed treatments, suspension concentrates, suspoemulsions, tablets, water soluble liquids, water dispersible granules or dry flowables, wettable powders, and ultra-low volume solutions.

Pesticides are applied most often as aqueous suspensions or emulsions prepared from concentrated formulations of such pesticides. Such water-soluble, water-suspendable, or emulsifiable formulations are either solids, usually known as wettable powders, water dispersible granules, liquids usually known as emulsifiable concentrates, or aqueous suspensions. Wettable powders, which may be compacted to form water dispersible granules, comprise an intimate mixture of the pesticide, a carrier, and surfactants. The concentration of the pesticide is usually from about 10% to about 90% by weight. The carrier is usually selected from among the attapulgite clays, the montmorillonite clays, the diatomaceous earths, or the purified silicates. Effective surfactants, comprising from about 0.5% to about 10% of the wettable powder, are found among sulfonated lignins, condensed naphthalenesulfonates, naphthalenesulfonates, alkylbenzenesulfonates, alkyl sulfates, and non-ionic surfactants such as ethylene oxide adducts of alkyl phenols.

Emulsifiable concentrates of pesticides comprise a convenient concentration of a pesticide, such as from about 50 to about 500 grams per liter of liquid dissolved in a carrier that is either a water miscible solvent or a mixture of water-immiscible organic solvent and emulsifiers. Useful organic solvents include aromatics, especially xylenes and petroleum fractions, especially the high-boiling naphthalenic and olefinic portions of petroleum such as heavy aromatic naphtha. Other organic solvents may also be used, such as the terpenic solvents including rosin derivatives, aliphatic ketones such as cyclohexanone, and complex alcohols such as 2-ethoxyethanol. Suitable emulsifiers for emulsifiable concentrates are selected from conventional anionic and non-ionic surfactants.

Aqueous suspensions comprise suspensions of water-insoluble pesticides dispersed in an aqueous carrier at a concentration in the range from about 5% to about 50% by weight. Suspensions are prepared by finely grinding the pesticide and vigorously mixing it into a carrier comprised of water and surfactants. Ingredients, such as inorganic salts and synthetic or natural gums may, also be added to increase the density and viscosity of the aqueous carrier. It is often most effective to grind and mix the pesticide at the same time by preparing the aqueous mixture and homogenizing it in an implement such as a sand mill, ball mill, or piston-type homogenizer. The pesticide in suspension might be microencapsulated in plastic polymer.

Oil dispersions (OD) comprise suspensions of organic solvent-insoluble pesticides finely dispersed in a mixture of organic solvent and emulsifiers at a concentration in the range from about 2% to about 50%, by weight. One or more pesticide might be dissolved in the organic solvent. Useful organic solvents include aromatics, especially xylenes and petroleum fractions, especially the high-boiling naphthalenic and olefinic portions of petroleum such as heavy aromatic naphtha. Other solvents may include vegetable oils, seed oils, and esters of vegetable and seed oils. Suitable emulsifiers for oil dispersions are selected from conventional anionic and non-ionic surfactants. Thickeners or gelling agents are added in the formulation of oil dispersions to modify the rheology or flow properties of the liquid and to prevent separation and settling of the dispersed particles or droplets.

Pesticides may also be applied as granular compositions that are particularly useful for applications to the soil. Granular compositions usually contain from about 0.5% to about 10% by weight of the pesticide, dispersed in a carrier that comprises clay or a similar substance. Such compositions are usually prepared by dissolving the pesticide in a suitable solvent and applying it to a granular carrier, which has been pre-formed to the appropriate particle size, in the range of from about 0.5 mm to about 3 mm. Such compositions may also be formulated by making a dough or paste of the carrier and formulation, and then crushing and drying to obtain the desired granular particle size. Another form of granules is a water emulsifiable granule (EG). It is a formulation consisting of granules to be applied as a conventional oil-in-water emulsion of the active ingredient(s), either solubilized or diluted in an organic solvent, after disintegration and dissolution in water. Water emulsifiable granules comprise one or several active ingredient(s), either solubilized or diluted in a suitable organic solvent that is (are) absorbed in a water soluble polymeric shell or some other type of soluble or insoluble matrix.

Dusts containing a pesticide are prepared by intimately mixing the pesticide in powdered form with a suitable dusty agricultural carrier, such as kaolin clay, ground volcanic rock, and the like. Dusts can suitably contain from about 1% to about 10% of the pesticide. Dusts may be applied as a seed dressing or as a foliage application with a dust blower machine.

It is equally practical to apply a pesticide in the form of a solution in an appropriate organic solvent, usually petroleum oil, such as the spray oils, which are widely used in agricultural chemistry.

Pesticides can also be applied in the form of an aerosol composition. In such compositions, the pesticide is dissolved or dispersed in a carrier, which is a pressure-generating propellant mixture. The aerosol composition is packaged in a container from which the mixture is dispensed through an atomizing valve.

Pesticide baits are formed when the pesticide is mixed with food or an attractant or both. When the pests eat the bait, they also consume the pesticide. Baits may take the form of granules, gels, flowable powders, liquids, or solids. Baits may be used in pest harborages.

Fumigants are pesticides that have a relatively high vapor pressure and hence can exist as a gas in sufficient concentrations to kill pests in soil or enclosed spaces. The toxicity of the fumigant is proportional to its concentration and the exposure time. They are characterized by a good capacity for diffusion and act by penetrating the pest's respiratory system or being absorbed through the pest's cuticle. Fumigants are applied to control stored product pests under gas proof sheets, in gas sealed rooms or buildings, or in special chambers.

Pesticides may be microencapsulated by suspending the pesticide particles or droplets in plastic polymers of various types. By altering, the chemistry of the polymer or by changing factors in the processing, microcapsules may be formed of various sizes, solubility, wall thicknesses, and degrees of penetrability. These factors govern the speed with which the active ingredient within is released, which in turn, affects the residual performance, speed of action, and odor of the product. The microcapsules might be formulated as suspension concentrates or water dispersible granules.

Oil solution concentrates are made by dissolving pesticide in a solvent that will hold the pesticide in solution. Oil solutions of a pesticide usually provide faster knockdown and kill of pests than other formulations due to the solvents themselves having pesticidal action and the dissolution of the waxy covering of the integument increasing the speed of uptake of the pesticide. Other advantages of oil solutions include better storage stability, better penetration of crevices, and better adhesion to greasy surfaces.

Another embodiment is an oil-in-water emulsion, wherein the emulsion comprises oily globules which are each provided with a lamellar liquid crystal coating and are dispersed in an aqueous phase, wherein each oily globule comprises at least one formulation which is agriculturally active, and is individually coated with a monolamellar or oligolamellar layer comprising: (1) at least one non-ionic lipophilic surface-active agent, (2) at least one non-ionic hydrophilic surface-active agent, and (3) at least one ionic surface-active agent, wherein the globules having a mean particle diameter of less than 800 nanometers.

Generally, the formulations of this disclosure can also contain other components. These components include, but are not limited to, wetters, spreaders, stickers, penetrants, buffers, sequestering agents, drift reduction agents, compatibility agents, anti-foam agents, cleaning agents, and emulsifiers. A few components are described below.

A wetting agent is a substance that when added to a liquid increases the spreading or penetration power of the liquid by reducing the interfacial tension between the liquid and the surface on which it is spreading. Wetting agents are used for two main functions in agrochemical formulations: during processing and manufacture to increase the rate of wetting of powders in water to make concentrates for soluble liquids or suspension concentrates; and during mixing of a product with water in a spray tank to reduce the wetting time of wettable powders and to improve the penetration of water into water-dispersible granules. Examples of wetting agents used in wettable powder, suspension concentrate, and water-dispersible granule formulations are: sodium lauryl sulfate; sodium dioctyl sulfosuccinate; alkyl phenol ethoxylates; and aliphatic alcohol ethoxylates.

A dispersing agent is a substance that adsorbs onto the surface of particles, helps to preserve the state of dispersion of the particles, and prevents them from reaggregating. Dispersing agents are added to agrochemical formulations to facilitate dispersion and suspension during manufacture, and to ensure the particles redisperse into water in a spray tank. They are widely used in wettable powders, suspension concentrates, and water-dispersible granules. Surfactants that are used as dispersing agents have the ability to adsorb strongly onto a particle surface and provide a charged or steric barrier to reaggregation of particles. The most commonly used surfactants are anionic, non-ionic, or mixtures of the two types. For wettable powder formulations, the most common dispersing agents are sodium lignosulfonates. For suspension concentrates, very good adsorption and stabilization are obtained using polyelectrolytes, such as sodium-naphthalene-sulfonate-formaldehyde-condensates. Tristyrylphenol ethoxylate phosphate esters are also used. Non-ionics such as alkylarylethylene oxide condensates and EO-PO block copolymers are sometimes combined with anionics as dispersing agents for suspension concentrates. In recent years, new types of very high molecular weight polymeric surfactants have been developed as dispersing agents. These have very long hydrophobic ‘backbones’ and a large number of ethylene oxide chains forming the ‘teeth’ of a ‘comb’ surfactant. These high molecular weight polymers can give very good long-term stability to suspension concentrates because the hydrophobic backbones have many anchoring points onto the particle surfaces. Examples of dispersing agents used in agrochemical formulations are: sodium lignosulfonates; sodium naphthalene sulfonate formaldehyde condensates; tristyrylphenol-ethoxylate-phosphate-esters; aliphatic alcohol ethoxylates; alkyl ethoxylates; EO-PO block copolymers; and graft copolymers.

An emulsifying agent is a substance that stabilizes a suspension of droplets of one liquid phase in another liquid phase. Without the emulsifying agent, the two liquids would separate into two immiscible liquid phases. The most commonly used emulsifier blends contain an alkylphenol or an aliphatic alcohol with twelve or more ethylene oxide units and the oil-soluble calcium salt of dodecylbenzenesulfonic acid. A range of hydrophile-lipophile balance (“HLB”) values from about 8 to about 18 will normally provide good stable emulsions. Emulsion stability can sometimes be improved by the addition of a small amount of an EO-PO block copolymer surfactant.

A solubilizing agent is a surfactant that will form micelles in water at concentrations above the critical micelle concentration. The micelles are then able to dissolve or solubilize water-insoluble materials inside the hydrophobic part of the micelle. The types of surfactants usually used for solubilization are non-ionics, sorbitan monooleates, sorbitan monooleate ethoxylates, and methyl oleate esters.

Surfactants are sometimes used, either alone or with other additives such as mineral or vegetable oils as adjuvants to spray-tank mixes to improve the biological performance of the pesticide on the target. The types of surfactants used for bioenhancement depend generally on the nature and mode of action of the pesticide. However, they are often non-ionics such as: alkyl ethoxylates; linear aliphatic alcohol ethoxylates; and aliphatic amine ethoxylates.

A carrier or diluent in an agricultural formulation is a material added to the pesticide to give a product of the required strength. Carriers are usually materials with high absorptive capacities, while diluents are usually materials with low absorptive capacities. Carriers and diluents are used in the formulation of dusts, wettable powders, granules, and water-dispersible granules.

Organic solvents are used mainly in the formulation of emulsifiable concentrates, oil-in-water emulsions, suspoemulsions, oil dispersions, and ultra-low volume formulations, and to a lesser extent, granular formulations. Sometimes mixtures of solvents are used. The first main groups of solvents are aliphatic paraffinic oils such as kerosene or refined paraffins. The second main group (and the most common) comprises the aromatic solvents such as xylene and higher molecular weight fractions of C9 and C10 aromatic solvents. Chlorinated hydrocarbons are useful as cosolvents to prevent crystallization of pesticides when the formulation is emulsified into water. Alcohols are sometimes used as cosolvents to increase solvent power. Other solvents may include vegetable oils, seed oils, and esters of vegetable and seed oils.

Thickeners or gelling agents are used mainly in the formulation of suspension concentrates, oil dispersions, emulsions and suspoemulsions to modify the rheology or flow properties of the liquid and to prevent separation and settling of the dispersed particles or droplets. Thickening, gelling, and anti-settling agents generally fall into two categories, namely water-insoluble particulates and water-soluble polymers. It is possible to produce suspension concentrate and oil dispersion formulations using clays and silicas. Examples of these types of materials, include, but are not limited to, montmorillonite, bentonite, magnesium aluminum silicate, and attapulgite. Water-soluble polysaccharides in water based suspension concentrates have been used as thickening-gelling agents for many years. The types of polysaccharides most commonly used are natural extracts of seeds and seaweeds or are synthetic derivatives of cellulose. Examples of these types of materials include, but are not limited to, guar gum; locust bean gum; carrageenam; alginates; methyl cellulose; sodium carboxymethyl cellulose (SCMC); and hydroxyethyl cellulose (HEC). Other types of anti-settling agents are based on modified starches, polyacrylates, polyvinyl alcohol, and polyethylene oxide. Another good anti-settling agent is xanthan gum.

Microorganisms can cause spoilage of formulated products. Therefore, preservation agents are used to eliminate or reduce their effect. Examples of such agents include, but are not limited to: propionic acid and its sodium salt; sorbic acid and its sodium or potassium salts; benzoic acid and its sodium salt; p-hydroxybenzoic acid sodium salt; methyl p-hydroxybenzoate, and 1,2-benzisothiazolin-3-one (BIT).

The presence of surfactants often causes water-based formulations to foam during mixing operations in production and in application through a spray tank. In order to reduce the tendency to foam, anti-foam agents are often added either during the production stage or before filling into bottles. Generally, there are two types of anti-foam agents, namely silicones and non-silicones. Silicones are usually aqueous emulsions of dimethyl polysiloxane, while the non-silicone anti-foam agents are water-insoluble oils, such as octanol and nonanol, or silica. In both cases, the function of the anti-foam agent is to displace the surfactant from the air-water interface.

“Green” agents (e.g., adjuvants, surfactants, solvents) can reduce the overall environmental footprint of crop protection formulations. Green agents are biodegradable and generally derived from natural and/or sustainable sources, e.g. plant and animal sources. Specific examples are: vegetable oils, seed oils, and esters thereof, also alkoxylated alkyl polyglucosides.

The formulations of this disclosure may be applied to any locus. Particular loci to apply such formulations include loci where alfalfa, almonds, apples, barley, beans, canola, corn, cotton, crucifers, flowers, fodder species (Rye Grass, Sudan Grass, Tall Fescue, Kentucky Blue Grass, and Clover), fruits, lettuce, oats, oil seed crops, oranges, peanuts, pears, peppers, potatoes, rice, sorghum, soybeans, strawberries, sugarcane, sugarbeets, sunflowers, tobacco, tomatoes, wheat (for example, Hard Red Winter Wheat, Soft Red Winter Wheat, White Winter Wheat, Hard Red Spring Wheat, and Durum Spring Wheat), and other valuable crops are growing or the seeds thereof are going to be planted.

The formulations of this disclosure may also be applied where plants, such as crops, are growing and where there are low levels (even no actual presence) of pests that can commercially damage such plants. Applying such formulations in such locus is to benefit the plants being grown in such locus. Such benefits, may include, but are not limited to: helping the plant grow a better root system; helping the plant better withstand stressful growing conditions; improving the health of a plant; improving the yield of a plant (e.g. increased biomass and/or increased content of valuable ingredients); improving the vigor of a plant (e.g. improved plant growth and/or greener leaves); improving the quality of a plant (e.g. improved content or composition of certain ingredients); and improving the tolerance to abiotic and/or biotic stress of the plant.

The formulations of this disclosure may be applied with ammonium sulfate when growing various plants as this may provide additional benefits.

The formulations of this disclosure may be applied on, in, or around plants genetically modified to express specialized traits, such as Bacillus thuringiensis (for example, Cry1Ab, Cry1Ac, Cry1Fa, Cry1A.105, Cry2Ab, Vip3A, mCry3A, Cry3Ab, Cry3Bb, Cry34Ab1/Cry35Ab1), other insecticidal toxins, or those expressing herbicide tolerance, or those with "stacked" foreign genes expressing insecticidal toxins, herbicide tolerance, nutrition-enhancement, or any other beneficial traits.

The formulations of this disclosure may be applied to the foliar and/or fruiting portions of plants to control pests. Either such formulations will come in direct contact with the pest, or the pest will consume such formulation when eating the plant or while extracting sap or other nutrients from the plant.

The formulations of this disclosure may also be applied to the soil, and when applied in this manner, root and stem feeding pests may be controlled. The roots may absorb such formulations thereby taking it up into the foliar portions of the plant to control above ground chewing and sap feeding pests.

Systemic movement of pesticides in plants may be utilized to control pests on one portion of the plant by applying (for example by spraying a locus) a formulation of this disclosure to a different portion of the plant. For example, control of foliar-feeding insects may be achieved by drip irrigation or furrow application, by treating the soil with for example pre- or post-planting soil drench, or by treating the seeds of a plant before planting.

The formulations of this disclosure may be used with baits. Generally, with baits, the baits are placed in the ground where, for example, termites can come into contact with, and/or be attracted to, the bait. Baits can also be applied to a surface of a building, (horizontal, vertical, or slant surface) where, for example, ants, termites, cockroaches, and flies, can come into contact with, and/or be attracted to, the bait.

The formulations of this disclosure may be encapsulated inside, or placed on the surface of a capsule. The size of the capsules can range from nanometer size (about 100-900 nanometers in diameter) to micrometer size (about 10-900 microns in diameter).

The formulations of this disclosure may be applied to eggs of pests. Because of the unique ability of the eggs of some pests to resist certain pesticides, repeated applications of such formulations may be desirable to control newly emerged larvae.

The formulations of this disclosure may be applied as seed treatments. Seed treatment may be applied to all types of seeds, including those from which plants genetically modified to express specialized traits will germinate. Representative examples include those expressing proteins toxic to invertebrate pests, such as Bacillus thuringiensis or other insecticidal toxins, those expressing herbicide tolerance, such as "Roundup Ready" seed, or those with "stacked" foreign genes expressing insecticidal toxins, herbicide tolerance, nutrition-enhancement, drought tolerance, or any other beneficial traits. Furthermore, such seed treatments with the formulations of this disclosure may further enhance the ability of a plant to withstand stressful growing conditions better. This results in a healthier, more vigorous plant, which can lead to higher yields at harvest time. Generally, about 1 gram of such formulation to about 500 grams per 100,000 seeds is expected to provide good benefits, amounts from about 10 grams to about 100 grams per 100,000 seeds is expected to provide better benefits, and amounts from about 25 grams to about 75 grams per 100,000 seeds is expected to provide even better benefits. The formulations of this disclosure may be applied with one or more active ingredients in a soil amendment.

The formulations of this disclosure may also be applied to invasive pests. Pests around the world have been migrating to new environments (for such pest) and thereafter becoming a new invasive species in such new environment. Such formulations may also be used on such new invasive species to control them in such new environments.

Before a pesticide may be used or sold commercially, such pesticide undergoes lengthy evaluation processes by various governmental authorities (local, regional, state, national, and international). Voluminous data requirements are specified by regulatory authorities and must be addressed through data generation and submission by the product registrant or by a third party on the product registrant's behalf, often using a computer with a connection to the World Wide Web. These governmental authorities then review such data and if a determination of safety is concluded, provide the potential user or seller with product registration approval. Thereafter, in that locality where the product registration is granted and supported, such user or seller may use or sell such pesticide.

The formulations of this disclosure may be tested to determine its efficacy against pests. Furthermore, mode of action studies may be conducted to determine if the formulation has a different mode of action than other pesticides. Thereafter, such acquired data may be disseminated, such as by the internet, to third parties.

The formulations described above can be prepared by any convenient means, e.g., by mixing the active compound of (I) and the conventional toxicant compound with one or more other carriers or vehicles such as, including but not limited to, those described herein before.

In an embodiment, a synergistic effect can be exhibited with the formulations of this disclosure.

Preferred embodiments of this disclosure are set forth in the clauses below.

1. A method for killing one or more agricultural pests, the method comprising bringing the agricultural pests into contact with a toxic amount of a formulation comprising:

(I). one or more compounds selected from the group consisting of:

(1) one or more compounds of structure (A), wherein the compounds of structure (A) comprise:

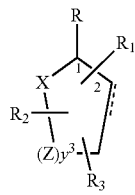

(A)

wherein

R is selected from the group consisting of —OH, =O, —OC(O)$R_4$, —O$R_6$, —(O$R_6$)$_2$, wherein each $R_6$ is independently selected from an alkyl group containing from 1 to 4 carbon atoms and $R_4$ is a branched or straight chain, saturated or unsaturated hydrocarbyl group with zero to two double bonds and from 1 to 15 carbon atoms;

X is O or $CH_2$, with the proviso that when X is O, then R can only be =O;

each Z is independently selected from the group consisting of (CH) and ($CH_2$);

y is a numeral selected from 1 and 2;

$R_1$ is selected from the group consisting of H or a branched or straight chain, saturated or unsaturated hydrocarbyl group with zero to two double bonds and from 1 to 15 carbon atoms;

$R_2$ is selected from the group consisting of H and a branched or straight chain, saturated or unsaturated hydrocarbyl group with zero to three double bonds and from 1 to 15 carbon atoms;

$R_3$ is selected from the group consisting of H and a branched or straight chain, saturated or unsaturated hydrocarbyl group with zero to three double bonds and from 1 to 15 carbon atoms, —($CH_2$)$_n$OH, —C(O)O$R_5$, —$CH_2$C(O)O$R_7$, —$CH_2$C(O)$R_8$, —C(O)N$R_9R_{10}$, —$CH_2$C(O)N$R_{11}R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (A) contain from 11 to 20 total carbon atoms; and (2) one or more sesquiterpenes selected from the group consisting of acyclic, monocyclic, bicyclic and tricyclic sesquiterpenes and derivatives thereof; and (II) one or more toxicant compounds selected from the group consisting of carbamates, organochlorines, pyrethroids, sulfoximines, neonicotinoids, pyridine azomethines, diamides, organophosphates, phenylpyrazoles, oxadiazines, and ketoenols.

2. The method according to clause 1 wherein the one or more toxicant compounds are selected from the group consisting of Aldicarb, Endosulfan, a synthetic pyrethroid, a sulfoximine, Thiamethoxam, Pymetrozine, a diamide, Chlorothalonil, and Chlorpyrifos.

3. The method according to clause 1 wherein the one or more agricultural pests are selected from the group consisting of Coleoptera, Diptera. Hymenoptera, Lepidoptera. Orthoptera, Thysanoptera, Acari, and Hemiptera.

4. The method according to clause 1 wherein the one or more agricultural pests are selected from the group consisting of beetles, flies, ants, moths, butterflies, grasshoppers, thrips, mites, true bugs, aphids, weevils and wasps.

5. The method according to clause 1 wherein the agricultural pests are selected from the group consisting of agricultural pests of fruit, agricultural pests of vegetables, agricultural pests of field crops, agricultural pests of ornamentals, agricultural pests of trees, and agricultural pests of turf.

6. The method according to clause 1 wherein the one or more compounds of structure (A) comprise a compound wherein R is =O or —OH, X is $CH_2$, Z is (CH) or ($CH_2$), y is 1, the bond between positions 2 and 3 is a single bond, $R_1$ is H, $R_2$ is H, and $R_3$ is an alkenyl group having at least 11 carbon atoms and 1 or 2 double bonds.

7. The method according to clause 1 wherein the one or more compounds of structure (A) comprise a compound wherein R is =O or —OH, X is $CH_2$, Z is (CH) or ($CH_2$), y is 1, the bond between positions 2 and 3 is a single bond, $R_1$ is an alkyl group having at least 5 carbon atoms, $R_2$ is H, and $R_3$ is —C(O)O$R_5$, and $R_5$ is an alkyl or alkenyl group containing at least 3 carbon atoms.

8. The method of clause 1 wherein the one or more compounds of structure (A) comprise a compound wherein R is =O, X is O, Z is CH or $CH_2$, y is 1 or 2, the bond between positions 2 and 3 is a single bond, $R_1$ is an alkyl group of from 7 to 11 carbon atoms, $R_2$ is H, and $R_3$ is H or $CH_3$.

9. The method according to clause 1 wherein the one or more compounds of structure (A) are selected from the group consisting of

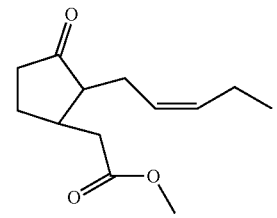

(Z)-methyl 2-(3-oxo-2-(pent-2-enyl)cyclpentyl)acetate
Chemical Formula: $C_{13}H_{20}O_3$
Molecular Weight: 224.30
Methyl Jasmonate

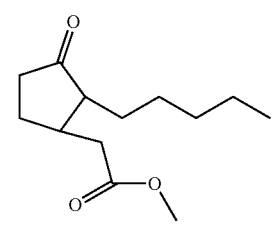

methyl 2-(3-oxo-2-pentylcyclopentyl)acetate
Chemical Formula: $C_{13}H_{22}O_3$
Molecular Weight: 226.31
Methyl Dihydro Jasmonate

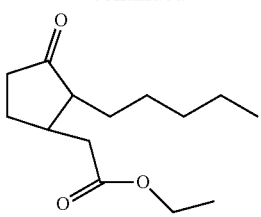

ethyl 2-(3-oxo-2-pentylcyclopentyl)acetate
Chemical Formula: $C_{14}H_{24}O_3$
Molecular Weight: 240.34
Ethyl Dihydro Jasmonate

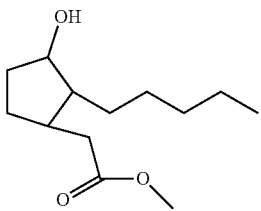

methyl 2-(3-hydroxy-2-pentylcyclopentyl)acetate
Chemical Formula: $C_{13}H_{24}O_3$
Molecular Weight: 228.33
Methyl Dihydro Jasmolate

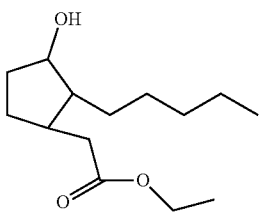

ethyl 2-(3-hydroxy-2-pentylcyclopentyl)acetate
Chemical Formula: $C_{14}H_{26}O_3$
Molecular Weight: 242.35
Ethyl Dihydro Jasmolate

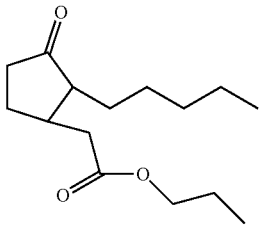

propyl 2-(3-oxo-2-pentylcyclopentyl)acetate
Chemical Formula: $C_{15}H_{26}O_3$
Molecular Weight: 254.37
Propyl Dihydro Jasmonate

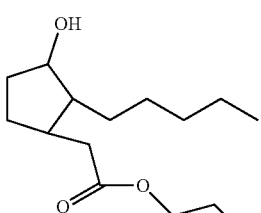

propyl 2-(3-hydroxy-2-pentylcyclopentyl)acetate
Chemical Formula: $C_{15}H_{28}O_3$
Molecular Weight: 256.38
Propyl Dihydro Jasmolate

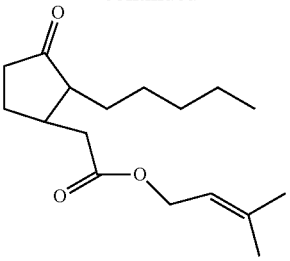

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate

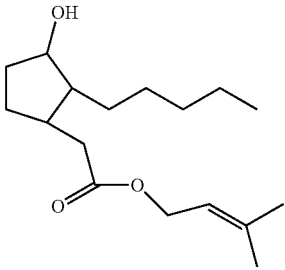

3-methylbut-2-enyl 2-(3-hydroxy-pentycyclopentyl)acetate
Chemical Formula: $C_{17}H_{30}O_3$
Molecular Weight: 282.42
Prenyl Dihdryo Jasmolate

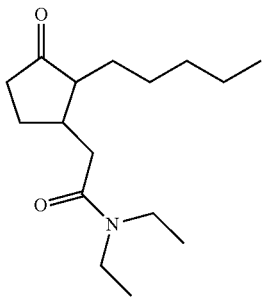

N,N-diethyl-2-(3-oxo-2-pentylcyclopentyl)acetamide
Chemical Formula: $C_{16}H_{29}NO_2$
Molecular Weight: 267.41
MDJ Amide

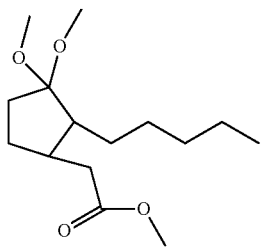

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

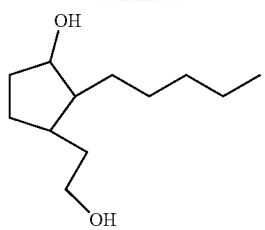

3-(2-hydroxyethyl)-2-pentylcyclopentanol
Chemical Formula: $C_{12}H_{24}O_2$
Molecular Weight: 200.32
MethylDihydroJasmodiol 10. The method according to clause 1 wherein the one or more compounds of structure (A) are selected from the group consisting of:

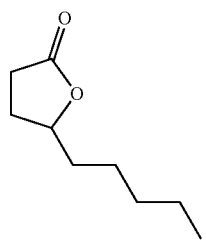

gamma Nonalactone
Chemical Formula: $C_9H_{16}O_2$
Molecular Weight: 156.22

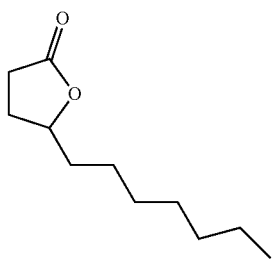

gamma Undecalactone
Chemical Formula: $C_{11}H_{20}O_2$
Molecular Weight: 184.28

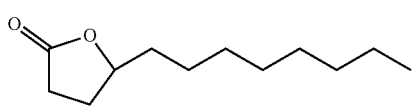

5-octyldihydrofuran-2(3H)-one
Chemical Formula: $C_{12}H_{22}O_2$
Molecular Weight: 198.30
gamma-dodecalactone

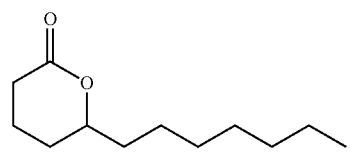

2H-Pyran-2-one, 6-heptyltetrahydro-
Chemical Formula: $C_{12}H_{22}O_2$
Molecular Weight: 198.31
Delta Dodecalactone

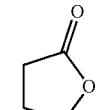

5-nonyldihydrofuran-2(3H)-one
Chemical Formula: $C_{13}H_{24}O$
Molecular Weight: 212.33
Gamma-Tridecalactone

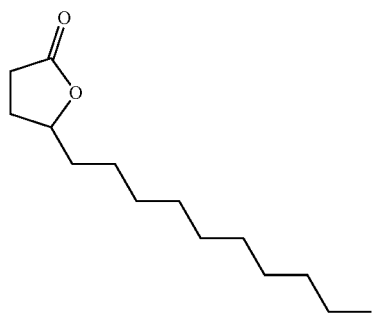

5-decyldihydrofuran-2(3H)-one
Chemical Formula: $C_{14}H_{26}O_2$
Molecular Weight: 226.36
Gamma-Tetradecalactone

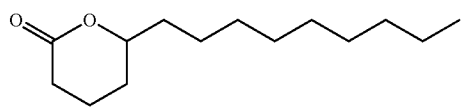

6-nonyltetrahydro-2H-pyran-2-one
Chemical Formula: $C_{14}H_{26}O_2$
Molecular Weight: 226.36
Delta-Tetradecalactone

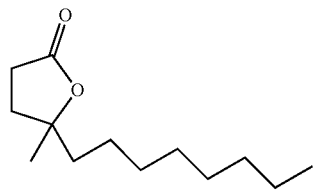

Gamma Methyl Dodecalactone
2(3H)-Furanone, 5-octyldihydro-5-methyl-

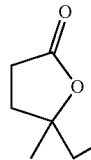

gamma Methyl Tridecalactone
5-Methyl-5-nonyldihydrofuran-2(3H)-one
4-methyl-4-nonyl gamma butyrolactone
C14 lactone 11. The method according to clause 1 wherein the one or more compounds of structure (A) are selected from the group consisting of

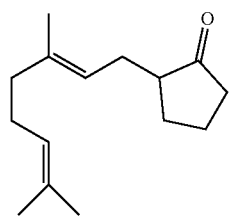

(E)-2-(3,7-dimethylocta-2,6-dienyl)cyclopentanone
Chemical Formula: $C_{15}H_{24}O$
Molecular Weight: 220.35
Apritone

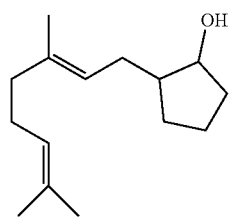

(E)-2-(3,7-dimethylocta-2,6-dienyl)cyclopentanol
Chemical Formula: $C_{15}H_{26}O$
Molecular Weight: 222.37
Apritol

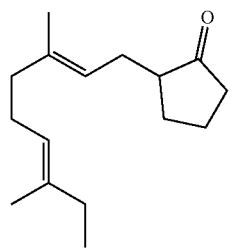

2-((2E,6E)-3,7-dimethylnona-2,6-dienyl)cyclopentanone
Chemical Formula: $C_{16}H_{26}O$
Molecular Weight: 234.38
Methyl Apritone

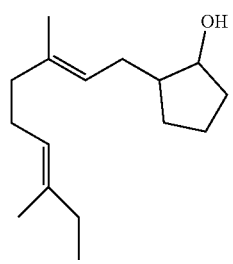

2-((2E,6E)-3,7-dimethylnona-2,6-dienyl)cyclopentanol
Chemical Formula: $C_{16}H_{28}O$
Molecular Weight: 236.39
Methyl Apritol -continued

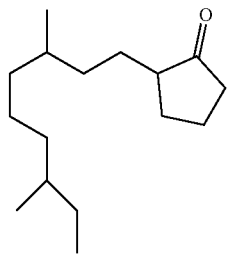

2-(3,7-dimethylnonyl)cyclopentanone
Chemical Formula: $C_{16}H_{30}O$
Molecular Weight: 238.41
Tetrahydromethyl Apritone

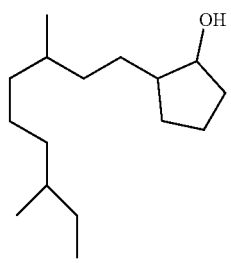

2-(3,7-dimethylnonyl)cyclopentanol
Chemical Formula: $C_{16}H_{32}O$
Molecular Weight: 240.42
Tetrahydromethyl Apritol 12. The method according to clause 1 wherein the one or more compounds of structure (A) are selected from the group consisting of:

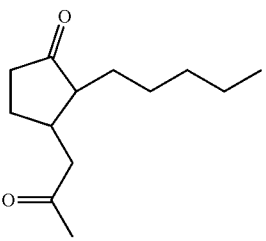

3-(2-oxopropyl)-2-pentylcyclopentanone
Chemical Formula: $C_{13}H_{22}O_2$
Molecular Weight: 210.31
Amyl Cyclopentanone Propanone

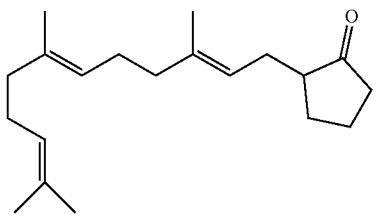

2-((2E,6E)-3,7,11-trimethyldodeca-
2,6,10-trienyl)cyclopentanone
Chemical Formula: $C_{20}H_{32}O$
Molecular Weight: 288.47
Farnesylcyclopentanone 13. The method according to clause 1 wherein the one or more compounds of structure (A) are selected from the group consisting of

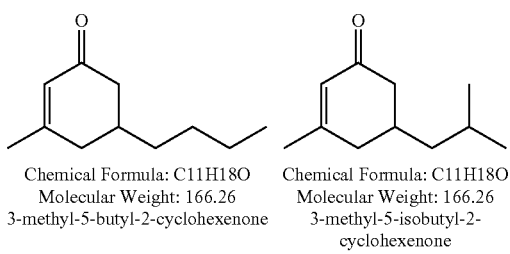

Chemical Formula: C11H18O
Molecular Weight: 166.26
3-methyl-5-butyl-2-cyclohexenone Chemical Formula: C11H18O
Molecular Weight: 166.26
3-methyl-5-isobutyl-2-cyclohexenone

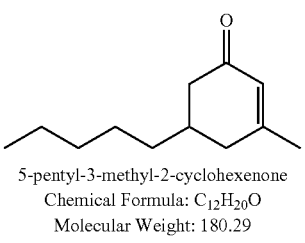

5-pentyl-3-methyl-2-cyclohexenone
Chemical Formula: $C_{12}H_{20}O$
Molecular Weight: 180.29

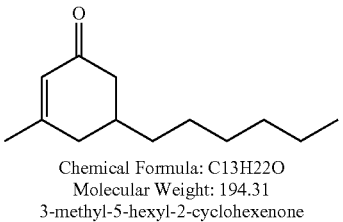

Chemical Formula: C13H22O
Molecular Weight: 194.31
3-methyl-5-hexyl-2-cyclohexenone

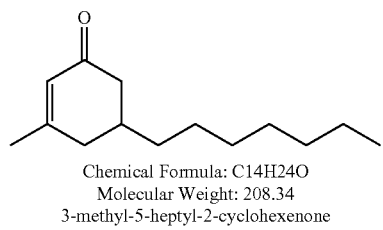

Chemical Formula: C14H24O
Molecular Weight: 208.34
3-methyl-5-heptyl-2-cyclohexenone

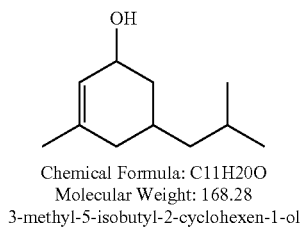

Chemical Formula: C11H20O
Molecular Weight: 168.28
3-methyl-5-isobutyl-2-cyclohexen-1-ol

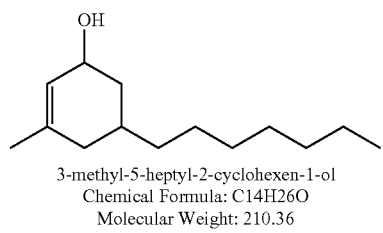

3-methyl-5-heptyl-2-cyclohexen-1-ol
Chemical Formula: C14H26O
Molecular Weight: 210.36

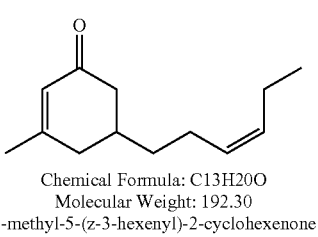

Chemical Formula: C13H20O
Molecular Weight: 192.30
3-methyl-5-(z-3-hexenyl)-2-cyclohexenone -continued

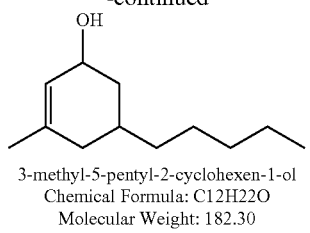

3-methyl-5-pentyl-2-cyclohexen-1-ol
Chemical Formula: C12H22O
Molecular Weight: 182.30

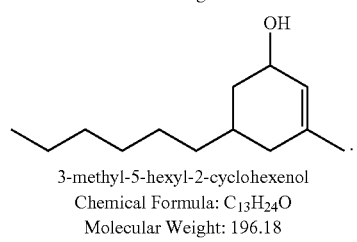

3-methyl-5-hexyl-2-cyclohexenol
Chemical Formula: $C_{13}H_{24}O$
Molecular Weight: 196.18

14. The method according to clause 1 wherein the one or more sesquiterpenes are selected from the group consisting of valencene, nootkatone, nootkatol, farnesene (alpha and beta), farnesol, nerolidol, bisobolene, bisabolol, humulene, caryophyllene, longifolene, longifolenone, patchoulene and patchoulol, including isomeric configurations thereof.

15. The method according to clause 1 wherein the one or more sesquiterpenes are selected from the group consisting of

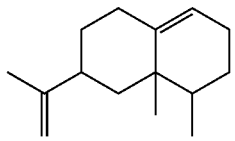

Valencene
Naphthalene, 1,2,3,5,6,7,8,8a-octahydro-1,8a-dimethyl-
7-(1-methylethenyl)-,
(1R,7R,8aS)-
Chemical Formula: $C_{15}H_{24}$
Molecular Weight: 204.35

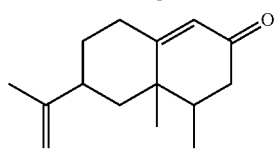

Nootkatone
2(3H)-Naphthalenone,4,4a,5,6,7,8-hexahydro-4,4a-dimethyl-
6-(1-methylethenyl)-, (4R,4aS,6R)-
Chemical Formula: $C_{15}H_{22}O$
Molecular Weight: 218.34

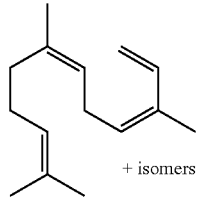

+ isomers

Farnesene
1,3,6,10-Dodecatetraene, 3,7,11-trimethyl-
Chemical Formula: $C_{15}H_{24}$
Molecular Weight: 204.35

-continued

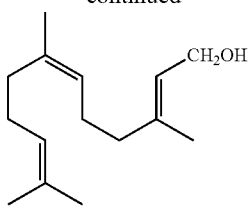

Farnesol
3,7,11-trimethyldodeca-2,6,10-trien-1-ol
Chemical Formula: $C_{15}H_{26}O$
Molecular Weight: 222.37

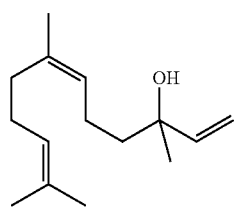

Nerolidol
1,6,10-Dodecatrien-3-ol, 3,7,11-trimethyl-
Chemical Formula: $C_{15}H_{26}O$
Molecular Weight: 222.37

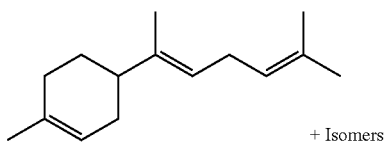

+ Isomers

Bisabolene
1-Methyl-4-(6-methylhept-5-en-2-ylidene)cyclohex-1-ene
Chemical Formula: $C_{15}H_{24}$
Molecular Weight: 204.35

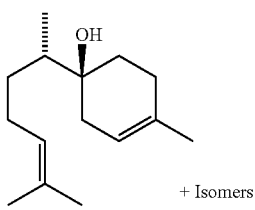

+ Isomers

Bisabolol
6-methyl-2-(4-methylcyclohex-3-en-1-yl)hept-5-en-2-ol
Chemical Formula: $C_{15}H_{26}O$
Molecular Weight: 222.37

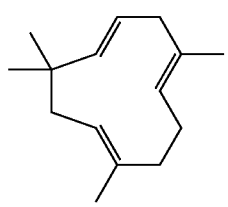

Humulene
2,6,6,9-Tetramethyl-1,4-8-cycloudecatriene
Chemical Formula: $C_{15}H_{24}$
Molecular Weight: 204.35

-continued

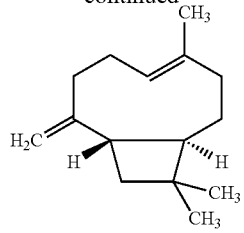

Caryophyllene
4,11,11-Trimethyl-8-methylidenebicyclo[7.2.0]undec-4-ene
Chemical Formula: $C_{15}H_{24}$
Molecular Weight: 204.35

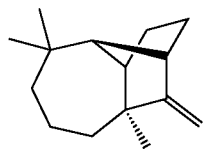

Longifolene + Isomers
(1R,2S,7S,9S)-3,3,7-trimethyl-8-methylenetricyclo-
[5.4.0.0$^{2,9}$]undecane
Chemical Formula: $C_{15}H_{24}$
Molecular Weight: 204.35

16. The method according to clause 1 wherein the agricultural pest is brought into contact with the formulation comprising one or more of the compounds of (I) and a carbamate of (II), wherein the carbamate is selected from the group consisting of alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, and xylylcarb.

17. The method according to clause 1 wherein the agricultural pest is brought into contact with the formulation comprising one or more of the compounds of (I) and an organochlorine of (II), wherein the organochlorine is selected from the group consisting of aldrin, dieldrin, endrin, heptachlor, chlordane, endosulfan, isobenzan, isodrin, dicofol, methoxychlor, benzene hexachloride, mirex, kepone, lindane, gamma-hexachlorocyclohexane, chlorobenziate, BHC, toxaphene, and chloro propylate.

18. The method according to clause 1 wherein the agricultural pest is brought into contact with the formulation comprising one or more of the compounds of (I) and a pyrethroid of (II), wherein the pyrethroid is selected from the group consisting of acrinathrin, allethrin, d-cis-trans allethrin, d-trans allethrin, bifenthrin, bioallethrin, bioallethrin scyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, thetacypermethrin, zeta-cypermethrin, cyphenothrin, (1r)-trans-isomers], deltamethrin, empenthrin (ez)-(1r)-isomers], esfenvalerate, etofenprox, fenpropathrin, fenvalerate, flucythrinate, flumethrin, tau-fluvalinate, halfenprox, imiprothrin, kadethrin, permethrin, phenothrin [(1r)-trans-isomer], prallethrin, pyrethrins (pyrethrum), resmethrin, silafluofen, tefluthrin, tetramethrin, tetramethrin, [(1r)-isomers], tralomethrin, and transfluthrin.

19. The method according to clause 1 wherein the agricultural pest is brought into contact with the formulation comprising one or more of the compounds of (I) and a sulfoximine of (II), wherein the sulfoximine is selected from the group consisting of sulfoxaflor, SFI-2, and SFI-3.

20. The method according to clause 1 wherein the agricultural pest is brought into contact with the formulation comprising one or more of the compounds of (I) and a neonicotinoid of (II), wherein the neonicotinoid is selected from the group consisting of imidacloprid, thiamethoxam, chlothianidin, acetamiprid, thiacloprid, dinotefuran, nitenpyram, and nithiazine.

21. The method according to clause 1 wherein the agricultural pest is brought into contact with the formulation comprising one or more of the compounds of (I) and a pyridine azomethine of (II), wherein the pyridine azomethine is selected from the group consisting of pymetrozine and pyrifluquinazon.

22. The method according to clause 1 wherein the agricultural pest is brought into contact with the formulation comprising one or more of the compounds of (I) and a diamide of (II), wherein the diamide is selected from the group consisting of flubendiamide, chlorantraniliprole, and cyantraniliprole.

23. The method according to clause 1 wherein the agricultural pest is brought into contact with the formulation comprising one or more of the compounds of (I) and an organophosphate of (II), wherein the organophosphate is selected from the group consisting of acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-s-methyl, diazinon, dichlorvos/ddvp, dicrotophos, dimethoate, dimethylvinphos, disulfoton, epn, ethion, ethoprophos, famphur, fenamiphos, fenitrothion, fenthion, fosthiazate, heptenophos, imicyafos, isofenphos, isopropyl o-(methoxyamino-thio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, and vamidothion.

24. The method according to clause 1 wherein the agricultural pest is brought into contact with the formulation comprising one or more of the compounds of (I) and a phenylpyrazole of (II), wherein the phenylpyrazole is selected from the group consisting of fipronil, acetoprole, ethiprole, flufiprole, pyraclofos, pyrafluprole, pyrolan, and vaniliprole.

25. The method according to clause 1 wherein the agricultural pest is brought into contact with the formulation comprising one or more of the compounds of (I) and an oxadiazine of (II), wherein the oxadiazine is selected from the group consisting of Indoxacarb.

26. The method according to clause 1 wherein the agricultural pest is brought into contact with the formulation comprising one or more of the compounds of (I) and a ketoenol of (II), wherein the ketoenol is selected from the group consisting of spirodiclofen, spiromesifen, and spirotetramat.

27. The method according to clause 1 wherein the one or more compounds of structure (A) comprise methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds of (II) comprise a carbamate, an organochlorine, a pyrethroid, a sulfoximine, a neonicotinoid, a pyridine azomethine, a diamide, an organophosphate, a phenylpyrazole, an oxadiazine, or a ketoenol.

28. The method according to clause 1 wherein the formulation is toxic to immature agricultural pests.

29. The method according to clause 1 wherein the formulation is present in a toxic or pesticidally effective amount, for agricultural purposes, from about 50 kilograms per acre or less, about 25 kilograms per acre or less, about 5 kilograms per acre or less, or about 1 kilogram per acre or less.

30. The method according to clause 1 wherein the formulation is a synergistic formulation.

31. The method according to clause 30 wherein the synergistic formulation produces, when the agricultural pests are brought into contact with the synergistic formulation, a combined toxicant effect greater than the sum of the separate toxicant effects from the separate compounds of (I) and toxicant compounds of (II), at comparable concentrations.

32. The method according to clause 1 wherein the formulation further comprises one or more of a carrier or diluent, an organic solvent, a thickener or gelling agent, a preservation agent, and a surfactant.

33. The method according to clause 1 wherein the formulation further comprises one or more of a wetter, a spreader, a sticker, a penetrant, a buffer, a sequestering agent, a drift reduction agent, a compatibility agent, an anti-form agent, a cleaning agent, and an emulsifier.

34. The method according to clause 1 wherein, for agricultural purposes, the compounds of (I) and toxicant compounds of (II) are formulated into granules, dusts, soluble powders, wettable powders, pastes, emulsifiable concentrates, aerosols, ultra low-volume concentrates, flowable suspensions, oils, sprays, lures, or biodegradable flakes.

35. The method according to clause 1 wherein the formulation is present in an amount sufficient to cause agricultural pests that are not easily contacted with a toxicant spray to move around such that they increase their contact with the one or more toxicant compounds of (II).

36. The method according to clause 1 wherein the one or more compounds of structure (A) are present in a toxic amount or a repellent amount sufficient to cause agricultural pests that are not easily contacted with a toxicant spray to move around such that they increase their contact with the one or more toxicant compounds of (II).

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

EXAMPLES

Protocols for the toxicity assessment of insecticides to arthropods of agricultural significance used in the Examples are set forth below.

Aphid Leaf Dip Bioassays

Bioassay protocols followed Brown et al. (2012) with some modifications. An individual leaf infested with aphids was removed from the rearing plant and randomly assigned to each treatment. Number of nymphs and adults were recorded. Each replicate consisted of 10 leaves assigned to a treatment plus 5 leaves dipped only in double distilled (dd) H2O to control for mortality. Each experiment was replicated 3×. Treatments consisted of commercial formulated insecticides at current labeled field rates or selected concentrations of technical grade products. After mixture, leaves were dipped in 250 ml of insecticide solution for 5 seconds. Each leaf was placed in a 100×15 mm petri dish and returned to the rearing room. Mortality was determined at 1-, 4-, and 24-hours after exposure. Aphids were considered dead if they were unable to right themselves or have no coordinated movement when prodded with a paint brush. Percent mortality was calculated and then corrected using Abbott's formula (Abbott 1925).

Adult Vial Tests

Adult vial test bioassays similar to those described by Temple et al. (2013) were used to determine susceptibility of insect adults to insecticides. Briefly, stock solutions of insecticides were prepared by dissolving insecticide in acetone. Serial dilutions were generated from the stock solution for desired concentrations. Concentrations (6) were selected to kill 95% of the individuals at the highest concentration and 10% at the lowest concentration. The interior surface of 20-ml glass scintillation vials was coated with 0.5 ml of the appropriate insecticide solution. Uncapped vials were rotated on a modified hot dog roller (Star Manufacturing International, St. Louis, Mo.) (heating element disconnected) until all acetone solution was evaporated, leaving only the insecticide residue. One adult weevil was placed into an insecticide-treated or solvent-treated vial. Mortality was determined at 1-, 4-, and 24 hours after exposure and insects were considered dead if they were unable to right themselves or have no coordinated movement when prodded with a metal probe. Three replications (30 insects per dose) were used for each species and insecticide. Data was analyzed using Polo-Plus (LeOra Software 2007) to obtain concentration dependent mortality (LC50) values. Non-overlapping confidence limits (95%) were used to detect significant differences between species and among insecticides.

Topical Bioassays

Topical toxicity bioassays were performed based on the method of Pridgeon et al (2008). Briefly, L4 *Helicoverpa zea* or adult *Piezodorus guildinii* were chilled on ice for three minutes, during which 1 μL of chemical (dissolved in 95% ethanol) was applied onto the ventral side of the using a handheld pipette. For each compound, five doses were applied to ten insects each, and repeated three times. An ethanol-only treatment was included in each experiment as a negative control. Insects were transferred into holding containers covered with netting. Hemipteran insects had free access to sugar water and the caterpillars were provided food substrate for the duration of the experiment. Mortality was recorded at the 4 and 24-hour time point. Mortality data was pooled and analyzed by log-probit using Poloplus® to determine 24 hour LD50 values. Three LD50 values were obtained and the mean LD50 value was used for statistical analysis.

Figure 2:
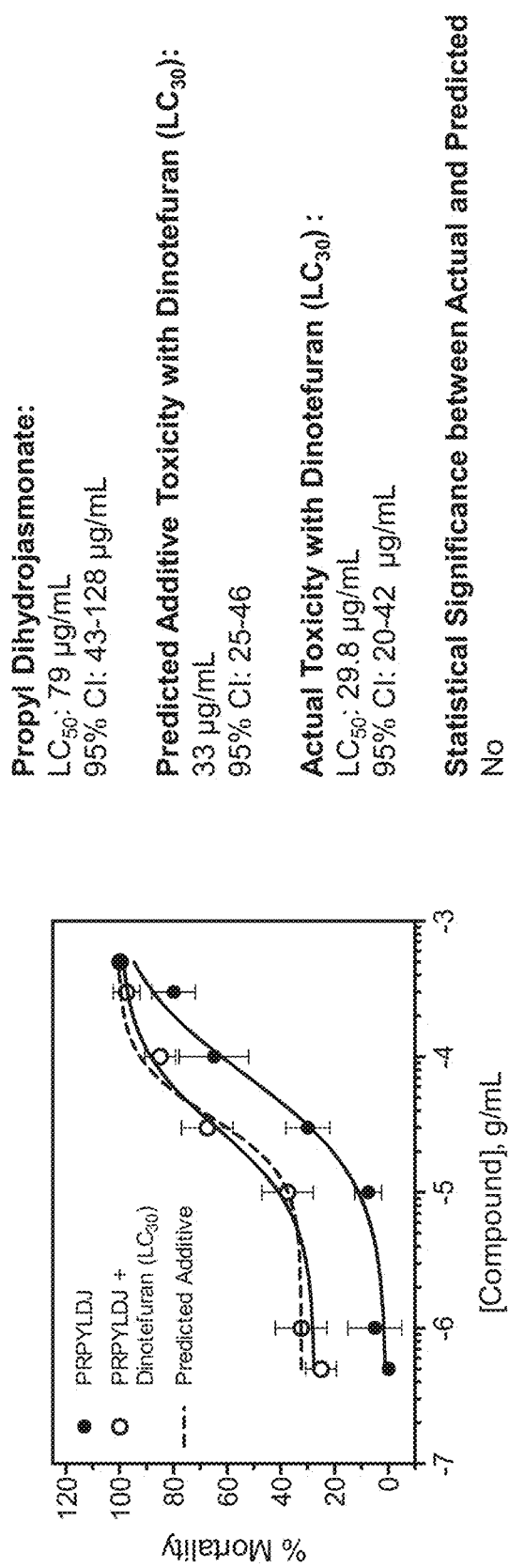
FIG. 2 graphically shows percent mortality for *Rhopalosiphum padi* (Hemipteran) with propyl dihydrojasmonate using protocols in accordance with the Examples.
Figure 4:
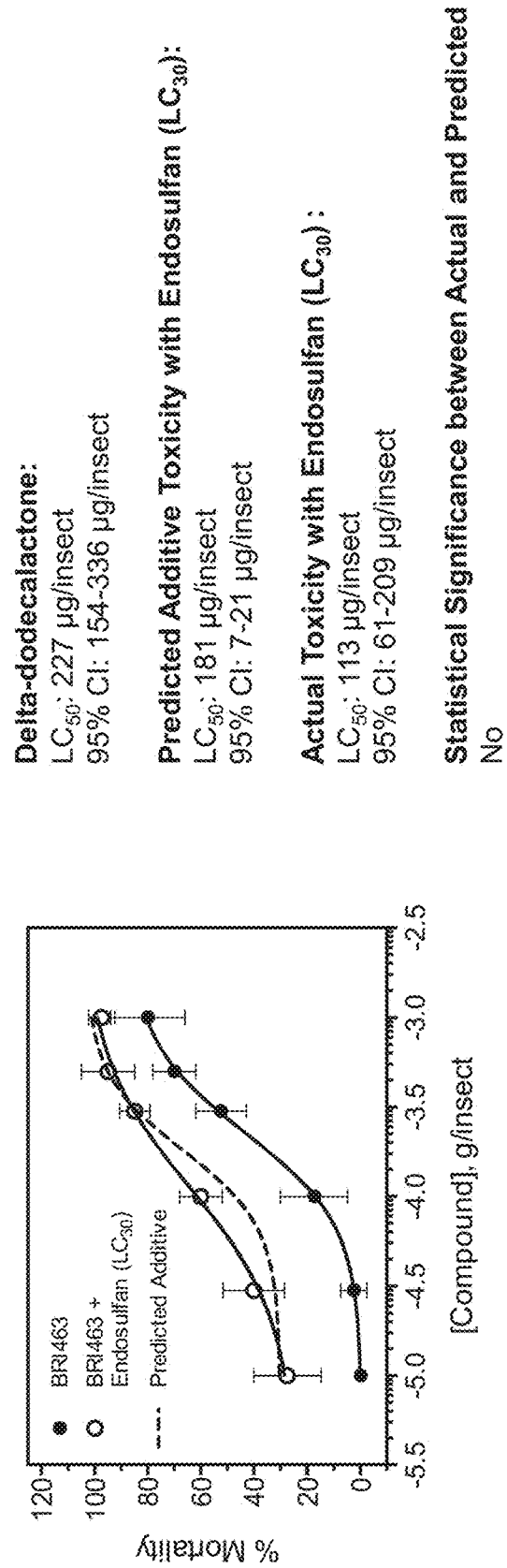
FIG. 4 graphically shows percent mortality for *Piezodorus guildinii* (Hemipteran) with delta dodecalactone using protocols in accordance with the Examples.

In accordance with the above protocols, data was generated for Coleopteran, Hemipteran and Lepidopteran insects of agricultural significance. FIG. 1 graphically shows percent mortality for *Cylas formicarius* (Coleopteran) with bisobalene using above protocols. FIG. 2 graphically shows percent mortality for *Rhopalosiphum padi* (Hemipteran) with propyl dihydrojasmonate using above protocols. FIG. 3 graphically shows percent mortality for *Helicoverpa zea* (Lepidopteran) with 3-methyl-5-hexyl-2-cyclohexen-1-one using above protocols. FIG. 4 graphically shows percent mortality for *Piezodorus guildini* (Hemipteran) with delta dodecalactone using above protocols.

In FIGS. 1-4, percentage means were calculated, alongside standard error values for each treatment group for knockdown and mortality data. Toxicity values were presented in LD50 and LD95 values at 4-, 12-, and 24-hours for each species tested.

What is claimed is:

1. A method for killing one or more agricultural pests, the method comprising bringing the agricultural pests into contact with a toxic amount of a formulation comprising:
   (I). one or more compounds selected from the group consisting of:
   (1) one or more compounds of structure (A), wherein the compounds of structure (A) are selected from:

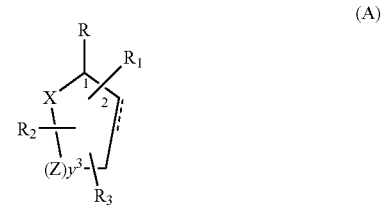

wherein
   R is selected from the group consisting of —OH, =O, —OC(O)R$_4$, —OR$_6$, —(OR$_6$)$_2$, wherein each R$_6$ is independently selected from an alkyl group containing from 1 to 4 carbon atoms and R$_4$ is a branched or straight chain, saturated or unsaturated hydrocarbyl group with zero to two double bonds and from 1 to 15 carbon atoms;
   X is O or CH$_2$, with the proviso that when X is O, then R can only be =O;
   each Z is independently selected from the group consisting of (CH) and (CH$_2$);
   y is a numeral selected from 1 and 2;
   R$_1$ is selected from the group consisting of H or a branched or straight chain, saturated or unsaturated hydrocarbyl group with zero to two double bonds and from 1 to 15 carbon atoms;
   R$_2$ is selected from the group consisting of H and a branched or straight chain, saturated or unsaturated hydrocarbyl group with zero to three double bonds and from 1 to 15 carbon atoms;
   R$_3$ is selected from the group consisting of H and a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms and n is an integer of from 1 to 12;
   the bond between the 2 and 3 positions in the ring structure may be a single or a double bond; and wherein the compounds of structure (A) contain from 11 to 20 total carbon atoms; and (2) one or more sesquiterpenes selected from the group consisting of acyclic, monocyclic, bicyclic and tricyclic sesquiterpenes, including isomeric configurations thereof; and (II) one or more toxicant compounds selected from the group consisting of carbamates, organochlorines, pyrethroids, sulfoximines, neonicotinoids, pyridine azomethines, diamides, organophosphates, phenylpyrazoles, oxadiazines, and ketoenols;

wherein the one or more compounds of (I) are present in a toxic amount or a repellent amount sufficient to cause agricultural pests that are not easily contacted with a toxicant spray to move around such that they increase their contact with the one or more toxicant compounds of (II).

2. The method according to claim 1 wherein the one or more toxicant compounds are selected from the group consisting of Aldicarb, Endosulfan, a synthetic pyrethroid, a sulfoximine, Thiamethoxam, Pymetrozine, a diamide, Chlorothalonil, and Chlorpyrifos.

3. The method according to claim 1 wherein the one or more agricultural pests are selected from the group consisting of Coleoptera, Diptera, Hymenoptera, Lepidoptera, Orthoptera, Thysanoptera, Acari, and Hemiptera.

4. The method according to claim 1 wherein the one or more agricultural pests are selected from the group consisting of beetles, flies, ants, moths, butterflies, grasshoppers, thrips, mites, true bugs, aphids, weevils and wasps.

5. The method according to claim 1 wherein the agricultural pests are selected from the group consisting of agricultural pests of fruit, agricultural pests of vegetables, agricultural pests of field crops, agricultural pests of ornamentals, agricultural pests of trees, and agricultural pests of turf.

6. The method according to claim 1 wherein the one or more compounds of structure (A) are selected from a compound wherein R is =O or —OH, X is $CH_2$, Z is (CH) or ($CH_2$), y is 1, the bond between positions 2 and 3 is a single bond, $R_1$ is H, $R_2$ is H, and $R_3$ is an alkenyl group having at least 11 carbon atoms and 1 or 2 double bonds; or wherein the one or more compounds of structure (A) are selected from a compound wherein R is =O or —OH, X is $CH_2$, Z is (CH) or ($CH_2$), y is 1, the bond between positions 2 and 3 is a single bond, $R_1$ is an alkyl group having at least 5 carbon atoms, $R_2$ is H, and $R_3$ is C(O)$OR_5$, and $R_5$ is an alkyl or alkenyl group containing at least 3 carbon atoms; or wherein the one or more compounds of structure (A) are selected from a compound wherein R is =O, X is O, Z is CH or $CH_2$, y is 1 or 2, the bond between positions 2 and 3 is a single bond, $R_1$ is an alkyl group of from 7 to 11 carbon atoms, $R_2$ is H, and $R_3$ is H or $CH_3$.

7. The method according to claim 1 wherein the one or more compounds of structure (A) are selected from the group consisting of (Z)-methyl 2-(3-oxo-2-(pent-2-enyl)cyclpentyl)acetate
Chemical Formula: $C_{13}H_{20}O_3$
Molecular Weight: 224.30
Methyl Jasmonate methyl 2-(3-oxo-2-pentylcyclopentyl)acetate
Chemical Formula: $C_{13}H_{22}O_3$
Molecular Weight: 226.31
Methyl Dihydro Jasmonate ethyl 2-(3-oxo-2-pentylcyclopentyl)acetate
Chemical Formula: $C_{14}H_{24}O_3$
Molecular Weight: 240.34
Ethyl Dihydro Jasmonate methyl 2-(3-hydroxy-2-pentylcyclopentyl)acetate
Chemical Formula: $C_{13}H_{24}O_3$
Molecular Weight: 228.33
Methyl Dihydro Jasmolate ethyl 2-(3-hydroxy-2-pentylcyclopentyl)acetate
Chemical Formula: $C_{14}H_{26}O_3$
Molecular Weight: 242.35
Ethyl Dihydro Jasmolate

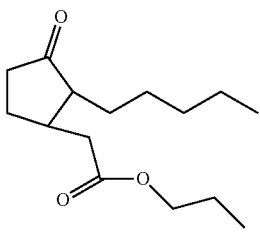

propyl 2-(3-oxo-2-pentylcyclopentyl)acetate
Chemical Formula: $C_{15}H_{26}O_3$
Molecular Weight: 254.37
Propyl Dihydro Jasmonate

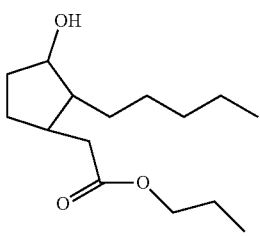

propyl 2-(3-hydroxy-2-pentylcyclopentyl)acetate
Chemical Formula: $C_{15}H_{28}O_3$
Molecular Weight: 256.38
Propyl Dihydro Jasmolate

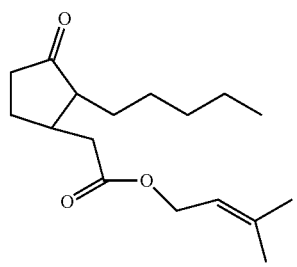

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate

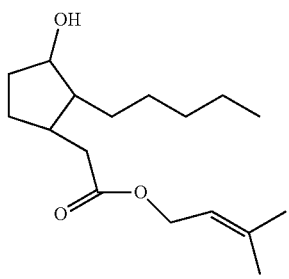

3-methylbut-2-enyl 2-(3-hydroxy-pentycyclopentyl)acetate
Chemical Formula: $C_{17}H_{30}O_3$
Molecular Weight: 282.42
Prenyl Dihdryo Jasmolate

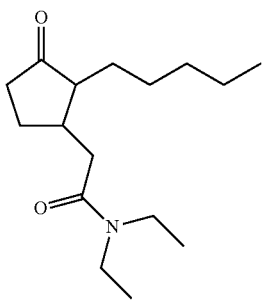

N,N-diethyl-2-(3-oxo-2-pentylcyclopentyl)acetamide
Chemical Formula: $C_{16}H_{29}NO_2$
Molecular Weight: 267.41
MDJ Amide

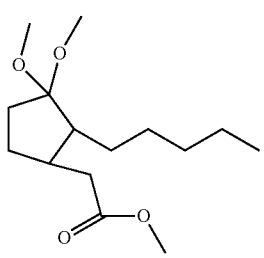

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

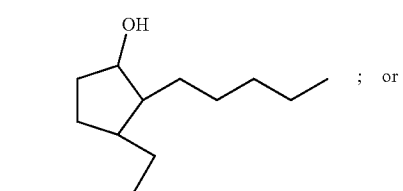

; or 3-(2-hydroxyethyl)-2-pentylcyclopentaol
Chemical Formula: $C_{12}H_{24}O_2$
Molecular Weight: 200.32
MethylDihydroJasmodiol wherein the one or more compounds of structure (A) are selected from the group consisting of:

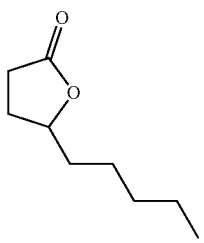

gamma Nonalactone
Chemical Formula: $C_9H_{16}O_2$
Molecular Weight: 156.22

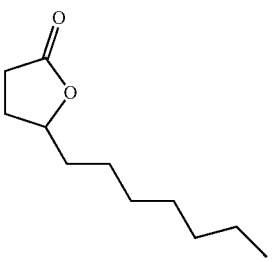

gamma Undecalactone
Chemical Formula: $C_{11}H_{20}O_2$
Molecular Weight: 184.28

-continued

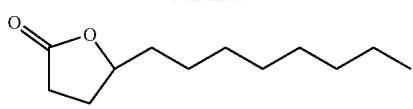

5-octyldihydrofuran-2(3H)-one
Chemical Formula: $C_{12}H_{22}O_2$
Molecular Weight: 198.30
gamma-dodecalactone

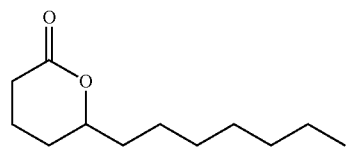

2H-Pyran-2-one, 6-heptyltetrahydro-
Chemical Formula: $C_{12}H_{22}O_2$
Molecular Weight: 198.31
Delta Dodecalactone

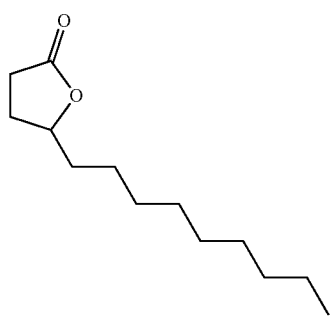

5-nonyldihydrofuran-2(3H)-one
Chemical Formula: $C_{13}H_{24}O$
Molecular Weight: 212.33
Gamma-Tridecalactone

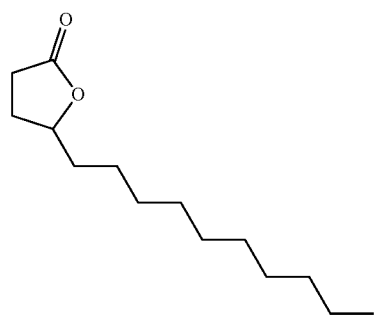

5-decyldihydrofuran-2(3H)-one
Chemical Formula: $C_{14}H_{26}O_2$
Molecular Weight: 226.36
Gamma-Tetradecalactone

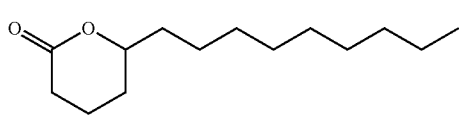

6-nonyltetrahydro-2H-pyran-2-one
Chemical Formula: $C_{14}H_{26}O_2$
Molecular Weight: 226.36
Delta-Tetradecalactone -continued

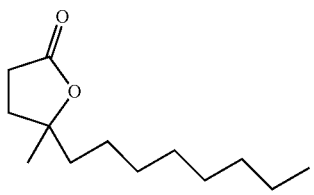

Gamma Methyl Dodecalactone
2(3H)-Furanone, 5-octyldihydro-5-methyl-

; or gamma Methyl Tridecalactone
5-Methyl-5-nonyldihydrofuran-2(3H)-one
4-methyl-4-nonyl gamma butyrolactone
C14 lactone wherein the one or more compounds of structure (A) are selected from the group consisting of

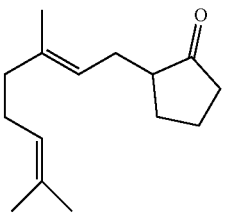

(E)-2-(3,7-dimethylocta-2,6-dienyl)cyclopentanone
Chemical Formula: $C_{15}H_{24}O$
Molecular Weight: 220.35
Apritone

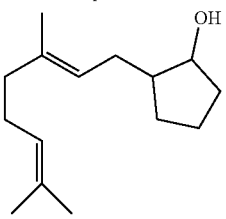

(E)-2-(3,7-dimethylocta-2,6-dienyl)cyclopentanol
Chemical Formula: $C_{15}H_{26}O$
Molecular Weight: 222.37
Apritol

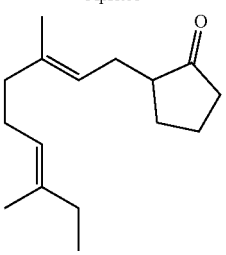

2-((2E,6E)-3,7-dimethylnona-2,6-dienyl)cyclopentanone
Chemical Formula: $C_{16}H_{26}O$
Molecular Weight: 234.38
Methyl Apritone -continued

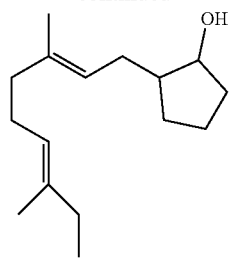

2-((2E,6E)-3,7-dimethylnona-2,6-dienyl)cyclopentanol
Chemical Formula: $C_{16}H_{28}O$
Molecular Weight: 236.39
Methyl Apritol

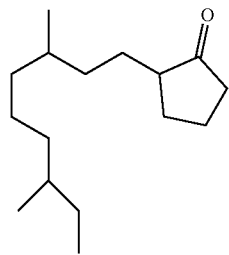

2-(3,7-dimethylnonyl)cyclopentanone
Chemical Formula: $C_{16}H_{30}O$
Molecular Weight: 238.41
Tetrahydromethyl Apritone

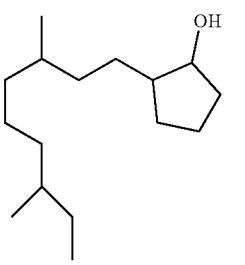   ; or 2-(3,7-dimethylnonyl)cyclopentanol
Chemical Formula: $C_{16}H_{32}O$
Molecular Weight: 240.42
Tetrahydromethyl Apritol wherein the one or more compounds of structure (A) are selected from the group consisting of:

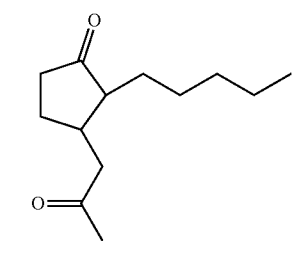

3-(2-oxopropyl)-2-pentylcyclopentanone
Chemical Formula: $C_{13}H_{22}O_2$
Molecular Weight: 210.31
Amyl Cyclopentanone Propanone -continued

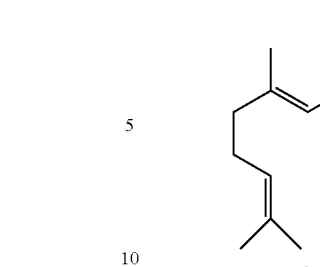

2-((2E,6E)-3,7,11-trimethyldodeca-2,6,10-trienyl)cyclopentanone
Chemical Formula: $C_{20}H_{32}O$
Molecular Weight: 288.47
Farnesylcyclopentanone ; or wherein the one or more compounds of structure (A) are selected from the group consisting of

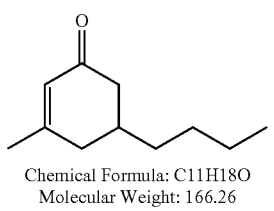  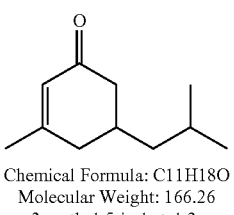

Chemical Formula: C11H18O
Molecular Weight: 166.26
3-methyl-5-butyl-2-cyclohexenone Chemical Formula: C11H18O
Molecular Weight: 166.26
3-methyl-5-isobutyl-2-cyclohexenone

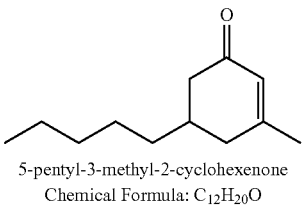

5-pentyl-3-methyl-2-cyclohexenone
Chemical Formula: $C_{12}H_{20}O$
Molecular Weight: 180.29

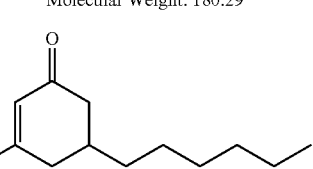

Chemical Formula: C13H22O
Molecular Weight: 194.31
3-methyl-5-hexyl-2-cyclohexenone

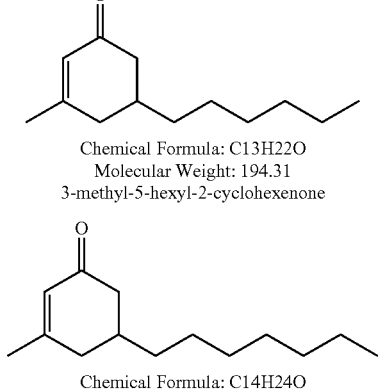

Chemical Formula: C14H24O
Molecular Weight: 208.34
3-methyl-5-heptyl-2-cyclohexenone

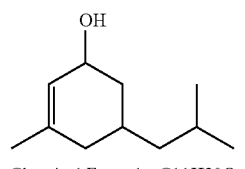

Chemical Formula: C11H20O
Molecular Weight: 168.28
3-methyl-5-isobutyl-2-cyclohexen-1-ol

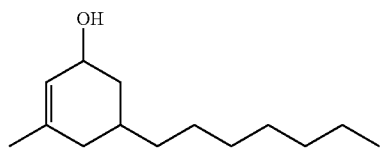

3-methyl-5-heptyl-2-cyclohexen-1-ol
Chemical Formula: C14H26O
Molecular Weight: 210.36

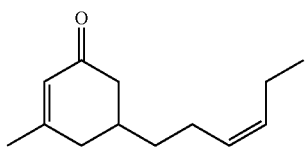

Chemical Formula: C13H20O
Molecular Weight: 192.30
3-methyl-5-(z-3-hexenyl)-2-cyclohexenone

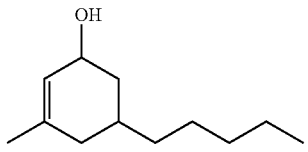

3-methyl-5-pentyl-2-cyclohexen-1-ol
Chemical Formula: C12H22O
Molecular Weight: 182.30

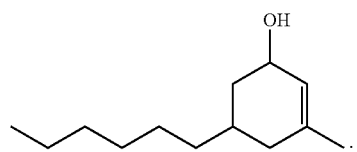

3-methyl-5-hexyl-2-cyclohexenol
Chemical Formula: $C_{13}H_{24}O$
Molecular Weight: 196.18

8. The method according to claim 1 wherein the one or more sesquiterpenes are selected from the group consisting of valencene, nootkatone, nootkatol, farnesene (alpha and beta), farnesol, nerolidol, bisobolene, bisabolol, humulene, caryophyllene, longifolene, longifolenone, patchoulene and patchoulol, including isomeric configurations thereof.

9. The method according to claim 1 wherein the one or more sesquiterpenes are selected from the group consisting of

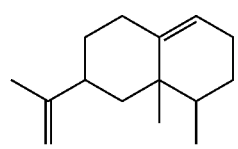

Valencene
Naphthalene, 1,2,3,5,6,7,8,8a-octahydro-1,8a-dimethyl-
7-(1-methylethenyl)-,
(1R,7R,8aS)-
Chemical Formula: $C_{15}H_{24}$
Molecular Weight: 204.35

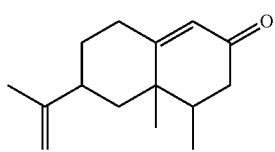

Nootkatone
2(3H)-Naphthalenone,4,4a,5,6,7,8-hexahydro-4,4a-dimethyl-
6-(1-methylethenyl)-, (4R,4aS,6R)-
Chemical Formula: $C_{15}H_{22}O$
Molecular Weight: 218.34

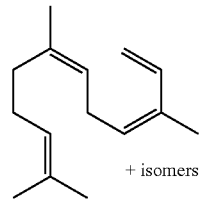

+ isomers

Farnesene
1,3,6,10-Dodecatetraene, 3,7,11-trimethyl-
Chemical Formula: $C_{15}H_{24}$
Molecular Weight: 204.35

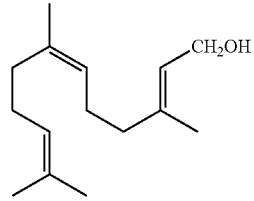

Farnesol
3,7,11-trimethyldodeca-2,6,10-trien-1-ol
Chemical Formula: $C_{15}H_{26}O$
Molecular Weight: 222.37

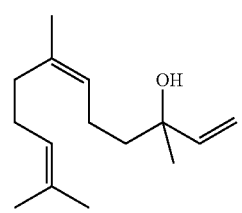

Nerolidol
1,6,10-Dodecatrien-3-ol, 3,7,11-trimethyl-
Chemical Formula: $C_{15}H_{26}O$
Molecular Weight: 222.37

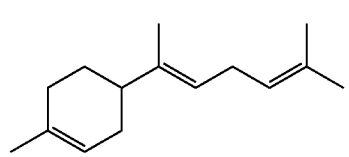

Bisabolene
1-Methyl-4-(6-methylhept-5-en-2-ylidene)cyclohex-1-ene
Chemical Formula: $C_{15}H_{24}$
Molecular Weight: 204.35

-continued

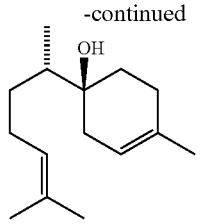

Bisabolol
6-methyl-2-(4-methylcyclohex-3-en-1-yl)hept-5-en-2-ol
Chemical Formula: $C_{15}H_{26}O$
Molecular Weight: 222.37

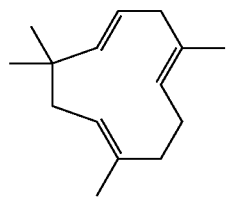

Humulene
2,6,6,9-Tetramethyl-1,4-8-cycloudecatriene
Chemical Formula: $C_{15}H_{24}$
Molecular Weight: 204.35

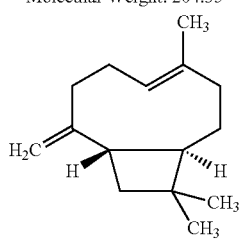

Caryophyllene
4,11,11-Trimethyl-8-methylidenebicyclo[7.2.0]undec-4-ene
Chemical Formula: $C_{15}H_{24}$
Molecular Weight: 204.35

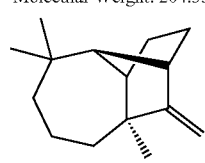

Longifolene
(1R,2S,7S,9S)-3,3,7-trimethyl-8-methylenetricyclo-
[5.4.0.0$^{2,9}$]undecane
Chemical Formula: $C_{15}H_{24}$
Molecular Weight: 204.35 including isometric configurations thereof.

10. The method according to claim 1 wherein the agricultural pest is brought into contact with the formulation comprising one or more of the compounds of (I) and a carbamate of (II), wherein the carbamate is selected from the group consisting of alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, and xylylcarb; or wherein the agricultural pest is brought into contact with the formulation comprising one or more of the compounds of (I) and an organochlorine of (II), wherein the organochlorine is selected from the group consisting of aldrin, dieldrin, endrin, heptachlor, chlordane, endosulfan, isobenzan, isodrin, dicofol, methoxychlor, benzene hexachloride, mirex, kepone, lindane, gamma-hexachlorocyclohexane, chlorobenziate, BHC, toxaphene, and chloro propylate; or wherein the agricultural pest is brought into contact with the formulation comprising one or more of the compounds of (I) and a pyrethroid of (II), wherein the pyrethroid is selected from the group consisting of acrinathrin, allethrin, d-cis-trans allethrin, d-trans allethrin, bifenthrin, bioallethrin, bioallethrin scyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, thetacypermethrin, zeta-cypermethrin, cyphenothrin, (1r)-trans-isomers], delta-methrin, empenthrin (ez)-(1r)-isomers], esfenvalerate, etofenprox, fenpropathrin, fenvalerate, flucythrinate, flumethrin, tau-fluvalinate, halfenprox, imiprothrin, kadethrin, permethrin, phenothrin [(1r)-trans-isomer], prallethrin, pyrethrins (pyrethrum), resmethrin, silaflu-ofen, tefluthrin, tetramethrin, tetramethrin, [(1r)-isomers], tralomethrin, and transfluthrin; or wherein the agricultural pest is brought into contact with the formulation comprising one or more of the compounds of (I) and a sulfoximine of (II), wherein the sulfoximine is selected from the group consisting of sulfoxaflor, SFI-2, and SFI-3; or wherein the agricultural pest is brought into contact with the formulation comprising one or more of the compounds of (I) and a neonicotinoid of (II), wherein the neonicotinoid is selected from the group consisting of imidacloprid, thiamethoxam, chlothianidin, acetamiprid, thiacloprid, dinotefuran, nitenpyram, and nithiazine; or wherein the agricultural pest is brought into contact with the formulation comprising one or more of the compounds of (I) and a pyridine azomethine of (II), wherein the pyridine azomethine is selected from the group consisting of pymetrozine and pyrifluquinazon; or wherein the agricultural pest is brought into contact with the formulation comprising one or more of the compounds of (I) and a diamide of (II), wherein the diamide is selected from the group consisting of flubendiamide, chlorantraniliprole, and cyantraniliprole; or wherein the agricultural pest is brought into contact with the formulation comprising one or more of the compounds of (I) and an organophosphate of (II), wherein the organophosphate is selected from the group consisting of acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-s-methyl, diazinon, dichlorvos/ddvp, dicrotophos, dimethoate, dimethylvinphos, disulfoton, epn, ethion, ethoprophos, famphur, fenamiphos, fenitrothion, fenthion, fosthiazate, heptenophos, imicyafos, isofenphos, isopropyl o-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, and vamidothion; or wherein the agricultural pest is brought into contact with the formulation comprising one or more of the compounds of (I) and a phenylpyrazole of (II), wherein the phenylpyrazole is selected from the group consisting of fipronil, acetoprole, ethiprole, flufiprole, pyraclofos, pyrafluprole, pyrolan, and vaniliprole; or wherein the agricultural pest is brought into contact with the formulation comprising one or more of the compounds of (I) and an oxadiazine of (II), wherein the oxadiazine is selected from the group consisting of Indoxacarb; or wherein the agricultural pest is brought into contact with the formulation comprising one or more of the compounds of (I) and a ketoenol of (II), wherein the ketoenol is selected from the group consisting of spirodiclofen, spiromesifen, and spirotetramat.

11. The method according to claim 1 wherein the one or more compounds of structure (A) are selected from methyl jasmonate, methyl dihydrojasmonate, ethyl dihydrojasmonate, methyl dihydrojasmolate (methyl 2-(3-hydroxy-2-pentylcyclopentyl)acetate), propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds of (II) are selected from a carbamate, an organochlorine, a pyrethroid, a sulfoximine, a neonicotinoid, a pyridine azomethine, a diamide, an organophosphate, a phenylpyrazole, an oxadiazine, or a ketoenol.

12. The method according to claim 1 wherein the formulation is toxic to immature agricultural pests.

13. The method according to claim 1 wherein the formulation is present in a toxic or pesticidally effective amount, for agricultural purposes, from about 50 kilograms per acre or less, about 25 kilograms per acre or less, about 5 kilograms per acre or less, or about 1 kilogram per acre or less.

14. The method according to claim 1 wherein the formulation is a synergistic formulation.

15. The method according to claim 14 wherein the synergistic formulation produces, when the agricultural pests are brought into contact with the synergistic formulation, a combined toxicant effect greater than the sum of the separate toxicant effects from the separate compounds of (I) and toxicant compounds of (II), at comparable concentrations.

16. The method according to claim 1 wherein the formulation further comprises one or more of a carrier or diluent, an organic solvent, a thickener or gelling agent, a preservation agent, and a surfactant.

17. The method according to claim 1 wherein the formulation further comprises one or more of a wetter, a spreader, a sticker, a penetrant, a buffer, a sequestering agent, a drift reduction agent, a compatibility agent, an anti-form agent, a cleaning agent, and an emulsifier.

18. The method according to claim 1 wherein, for agricultural purposes, the compounds of (I) and toxicant compounds of (II) are formulated into granules, dusts, soluble powders, wettable powders, pastes, emulsifiable concentrates, aerosols, ultra low-volume concentrates, flowable suspensions, oils, sprays, lures, or biodegradable flakes.

19. The method according to claim 1 wherein the formulation is present in an amount sufficient to cause agricultural pests that are not easily contacted with a toxicant spray to move around such that they increase their contact with the one or more toxicant compounds of (II).

\* \* \* \* \*